(12) United States Patent
McHenry et al.

(10) Patent No.: US 11,965,470 B2
(45) Date of Patent: Apr. 23, 2024

(54) HIGH EFFICIENCY TURBOCHARGER WITH EGR SYSTEM

(71) Applicant: BorgWarner Inc., Auburn Hills, MI (US)

(72) Inventors: Joseph Powell McHenry, Arden, NC (US); Paul Troxler, Asheville, NC (US); Robert Malcolm Wallace, Candler, NC (US); Michael Harris, Fairview, NC (US); Robert Lotz, Asheville, NC (US); Michael J. Burkett, Indianapolis, IN (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/851,366

(22) Filed: Jun. 28, 2022

(65) Prior Publication Data

US 2022/0325674 A1    Oct. 13, 2022

Related U.S. Application Data

(62) Division of application No. 16/553,227, filed on Aug. 28, 2019, now Pat. No. 11,408,362.

(Continued)

(51) Int. Cl.
*F02D 41/00*    (2006.01)
*F02D 19/02*    (2006.01)
(Continued)

(52) U.S. Cl.
CPC ....... *F02D 41/0077* (2013.01); *F02D 19/027* (2013.01); *F02D 43/04* (2013.01); *F02M 26/48* (2016.02)

(58) Field of Classification Search
CPC .. F02D 41/0077; F02D 41/1448; F02D 41/18; F02D 41/0072; F02D 41/0007;
(Continued)

(56) References Cited

U.S. PATENT DOCUMENTS 4,250,711 A    2/1981  Zehnder
4,689,959 A *  9/1987  Houkita .................. F02B 37/22
                                                      415/151

(Continued)

FOREIGN PATENT DOCUMENTS

EP    1589213 B1    7/2006
EP    1375893 B1    11/2006
(Continued)

*Primary Examiner* — Phutthiwat Wongwian
*Assistant Examiner* — Sherman D Manley
(74) *Attorney, Agent, or Firm* — von Briesen & Roper, s.c.

(57) ABSTRACT

In accordance with one aspect of the present disclosure, a turbocharger includes a compressor having a compressor wheel, a turbine provided within a housing, and an exhaust gas recirculation (EGR) flow path. The EGR flow path includes a first fluid connection in the housing and located in proximity to the turbine, a second fluid connection located in proximity to a trailing edge of the compressor wheel, an EGR control valve disposed between the first fluid connection and the second fluid connection, the EGR control valve configured to selectively operate the turbocharger in a low-heat mode having an EGR up to 50% and an operational mode having an EGR rate typically less than 35%.

20 Claims, 14 Drawing Sheets

Related U.S. Application Data

(60) Provisional application No. 62/820,057, filed on Mar. 18, 2019, provisional application No. 62/723,910, filed on Aug. 28, 2018.

(51) Int. Cl.
*F02D 43/04* (2006.01)
*F02M 26/48* (2016.01)

(58) Field of Classification Search
CPC ....... F02D 19/027; F02D 43/04; F02M 26/48; F02M 26/17; F02M 26/22; F02M 26/09; F02M 26/47; F02M 26/66; F02M 26/67; F02M 26/70; F02M 26/05; F02M 26/16; F02M 26/25; F02M 26/13; F02M 26/52; F02B 29/0475
See application file for complete search history.

(56) References Cited

U.S. PATENT DOCUMENTS

| | | | | |
|---|---|---|---|---|
| 4,719,757 A | * | 1/1988 | Nakazawa | F01D 17/18 29/889.22 |
| 5,406,796 A | | 4/1995 | Hiereth et al. | |
| 5,740,785 A | * | 4/1998 | Dickey | F02D 9/04 123/568.24 |
| 6,089,019 A | * | 7/2000 | Roby | F02M 26/51 60/602 |
| 6,145,313 A | * | 11/2000 | Arnold | F02B 37/24 60/605.2 |
| 6,263,672 B1 | | 7/2001 | Roby et al. | |
| 6,301,889 B1 | | 10/2001 | Gladden et al. | |
| 6,321,537 B1 | * | 11/2001 | Coleman | F02B 37/001 60/605.1 |
| 6,494,041 B1 | * | 12/2002 | Lebold | F02M 26/05 123/568.21 |
| 6,553,763 B1 | | 4/2003 | Callas et al. | |
| 7,201,159 B2 | * | 4/2007 | Veinotte | F16K 11/052 123/568.17 |
| 9,303,650 B2 | | 4/2016 | Ulrey et al. | |
| 2001/0032467 A1 | | 10/2001 | Martin | |
| 2003/0182049 A1 | | 9/2003 | Bale et al. | |
| 2008/0298953 A1 | * | 12/2008 | Harris | F02B 37/186 415/144 |
| 2013/0195628 A1 | | 8/2013 | Keefover | |
| 2015/0369120 A1 | * | 12/2015 | Hodebourg | F02M 26/70 137/627.5 |
| 2017/0122339 A1 | | 5/2017 | Sun et al. | |
| 2018/0003133 A1 | | 1/2018 | McHenry et al. | |

FOREIGN PATENT DOCUMENTS

| | | |
|---|---|---|
| EP | 2935851 B1 | 5/2016 |
| JP | 2012140876 A | 7/2012 |
| JP | 2012149588 A | 8/2012 |
| JP | 2012229677 A | 11/2012 |
| WO | 9943943 A1 | 9/1999 |
| WO | 2010123411 A1 | 10/2010 |

* cited by examiner

HIGH EFFICIENCY TURBOCHARGER WITH EGR SYSTEM

CROSS-REFERENCE TO RELATED APPLICATIONS

This application is a divisional of copending U.S. patent application Ser. No. 16/553,227, filed Aug. 28, 2019, and claims the benefit of U.S. Patent Application No. 62/723,910 filed on Aug. 28, 2018, and U.S. Patent Application No. 62/820,057 filed on Mar. 18, 2019 the disclosures of which are herein incorporated by reference in their entirety.

TECHNICAL FIELD

The present disclosure generally relates to a turbocharger systems for internal combustion engines, and more particularly, relates to exhaust gas driven turbocharger systems.

BACKGROUND

Exhaust Gas Recirculation (EGR) is utilized to abate nitrous oxide ($NO_x$) production. In EGR systems, exhaust gas from an internal combustion engine is recirculated to intake tracts for the engine. A pressure differential is required to drive gas flow from the exhaust of an engine to the intake tracts. This pressure differential requirement may create a disadvantageous pumping loop for the engine, requiring the engine to provide additional work to drive EGR flow, that results in lower system efficiency.

U.S. Patent Application Publication No. 2018/0003133 A by McHenry, et al., describes an engine intake system having a compressor wheel disposed on a shaft. A compressor cover connected to a bearing housing creates a compressor body to define a chamber within which the compressor wheel rotates. The compressor body includes an inlet to receive exhaust gas. EGR flow is provided from an EGR distribution cavity, via an EGR passage, to a diffuser.

SUMMARY

In accordance with an embodiment, a turbocharger includes a compressor having a compressor wheel, a turbine provided within a housing, and an exhaust gas recirculation (EGR) flow path. The EGR flow path includes a first fluid connection in the housing and located in proximity to the turbine, a second fluid connection located in proximity to a trailing edge of the compressor wheel, and an EGR control valve disposed between the first fluid connection and the second fluid connection. The EGR control valve is configured to selectively vary an EGR rate. In some embodiments, the EGR rate is varied between 0% and 50% based on a mode of operation of the turbocharger.

In accordance with another embodiment of the present invention, an EGR control valve for a turbine volute includes a sealing flap operationally connected to a rotational drive mechanism at a proximal end, the sealing flap having a sealing surface with rounded edges. The EGR control valve further includes a vertical offset between the rotational drive mechanism and a chamfered edge of a turbine volute opening, an EGR outlet duct configured to be mated to a volute opening and provide for an EGR flow path. The rotational drive mechanism is configured to operate the sealing flap between a first position and a second position. In the first position, the turbine volute opening is sealed by the rounded edges mating with the chamfered edge of the turbine volute opening. In the second position, the EGR flow path is provided from the turbine volute through the turbine volute opening to the EGR outlet duct. In intermediate positions, flow is permitted to both the EGR flow path and the turbine exhaust path.

Yet another embodiment provides for a method of assembling an EGR control valve. The method includes providing an opening in a volute of a turbine housing, machining of interior sealing surfaces of the volute via the opening, installing a sealing flap operationally connected to a rotational drive mechanism, the rotational drive mechanism disposed in the turbine housing and located at a vertical offset from a seating surface of the opening, and attaching an EGR duct to the opening.

In another embodiment, a turbocharger compressor EGR volute includes an EGR inlet configured to receive EGR flow, an EGR outlet disposed in proximity to a trailing edge of a compressor wheel providing a fresh air flow, and a linear cross-sectional area progression around the turbocharger compressor volute between the EGR inlet and the EGR outlet.

These and other aspects and features of the present disclosure will be more readily understood when read in conjunction with the accompanying drawings.

DETAILED DESCRIPTION

Figure 1A:
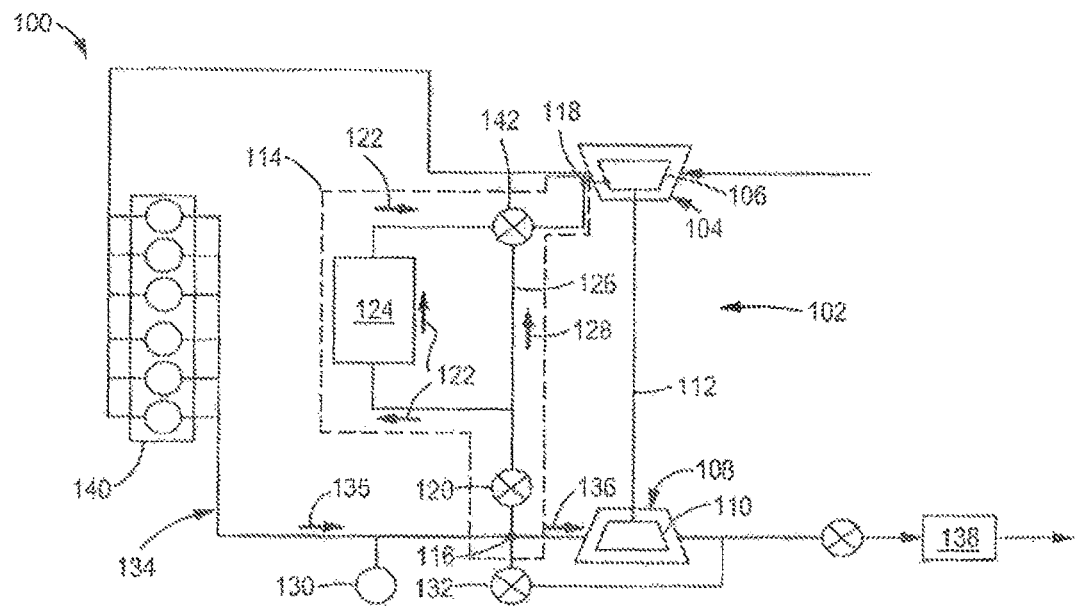
FIG. 1A depicts a system overview of a first engine air system, in accordance with an embodiment of the present disclosure.

Referring now to the drawings, FIG. 1A depicts a first system overview of an engine air system, in accordance with an embodiment of the present disclosure. The illustrated engine air system 100 includes a turbocharger 102. The turbocharger 102 includes a compressor 104 having a compressor wheel 106 and a turbine 108 having a turbine wheel 110. The compressor wheel 106 and the turbine wheel 110 are connected by a common shaft 112. The compressor receives inlet fresh air and compresses the fresh air for introduction into an engine 140 that may have a number of cylinders for the controlled combustion of fuel to produce power. The fresh air received by the compressor may include air from other sources than ambient air. For example, air entering the compressor 104 may include air from a positive crankcase ventilation (PCV) system, EGR, EGR introduced before the compressor stage that is pulled from the exhaust after the turbine, or other fluids present in the airflow. Exhaust gas generated during combustion exits the engine 140 via the exhaust manifold 134. At least some of the exhaust gas is expanded in the turbine 108, which releases energy to drive the turbine wheel 110.

Some or all of the exhaust gas may be provided to an EGR flow path 114 back to the compressor 104. The EGR flow path 114 may include a first fluid connection 116 in the housing located in proximity to the turbine 108 and a second fluid connection 118 located in proximity to a trailing edge of the compressor wheel 106. The EGR flow path 114 may also include an EGR cooler flow path 122 through an EGR cooler 124, and an EGR cooler bypass 126 that provides a parallel flow path 128 to the EGR cooler flow path 122.

The quantity of exhaust gas provided to the EGR flow path 114 is determined at least in part on the position (i.e., a degree of opening between and including fully closed and fully open) of an EGR control valve 120. The EGR control valve 120 is disposed between the first fluid connection 116 and the second fluid connection 118. In some embodiments, the turbocharger 102 operates in a low-heat mode with the EGR control valve providing an EGR rate greater than a nominal EGR rate for normal (e.g., at-temperature) operating parameters. In some embodiments, when operating in a low-heat mode the EGR rate is over 40%, and in some embodiments up to a 50% EGR rate. In a normal operating mode (e.g., at-temperature operational mode) of the turbocharger 102, the EGR control valve 120 provides for a nominal EGR rate, typically less than 35%, although this may be varied based on operating conditions. A desired EGR rate is determined based on operating parameters of the engine system, and the EGR rate is obtained at least in part by repositioning the EGR control valve to a determined position. The EGR rate is determined based on a percentage of exhaust gas that is provided to the EGR flow path 114 as compared to the portion that is provided to the turbine exhaust path 136. For example, an EGR control valve 120 that is positioned to direct half of the engine manifold flow 135 to the EGR flow path 114 and half to the turbine exhaust path 136 may be referred to as having a 50% EGR rate. Further, an EGR control valve 120 that is positioned to direct all of the engine manifold flow 135 to the turbine exhaust path 136 may be referred to as having a 0% EGR rate.

The compressor 104 compresses fresh air for introduction into the engine 140. Accordingly, the total pressure of the fresh air increases. However, not all of the static pressure rise occurs across the compressor wheel 106. The air exiting the compressor wheel 106 is at a higher velocity than that at the compressor outlet at approximately equivalent total pressure. Since static pressure lowers with increased fluid velocity, the lowest dynamic pressure after the compressor wheel 106 is realized in proximity to the trailing edge of the compressor wheel 106 (e.g., at the second fluid connection 118). After fresh air exits the compressor wheel 106, it may expand radially outward through a diffuser. As the gas proceeds through the diffuser, the cross-sectional area increases and the speed of the fluid decreases, causing an increase in the static pressure.

To drive EGR flow (e.g., via the EGR flow path 114), a pressure differential is required between the first fluid connection 116 (e.g., high pressure of the engine exhaust) and the second fluid connection 118 (e.g., low static pressure due to fast-moving fresh air at the trailing edge of the compressor wheel 106 before it expands in the diffuser). This pressure differential that drives the EGR flow causes a sufficient quantity of exhaust gas (e.g., engine manifold flow 135) to flow to the air intake (e.g., to the second fluid connection 118) for recirculation through the combustion chambers of the engine 140. The amount of EGR flow may be controlled by a position of the EGR control valve 120 for various operating conditions of the engine 140 and the turbocharger 102.

Figure 1B:
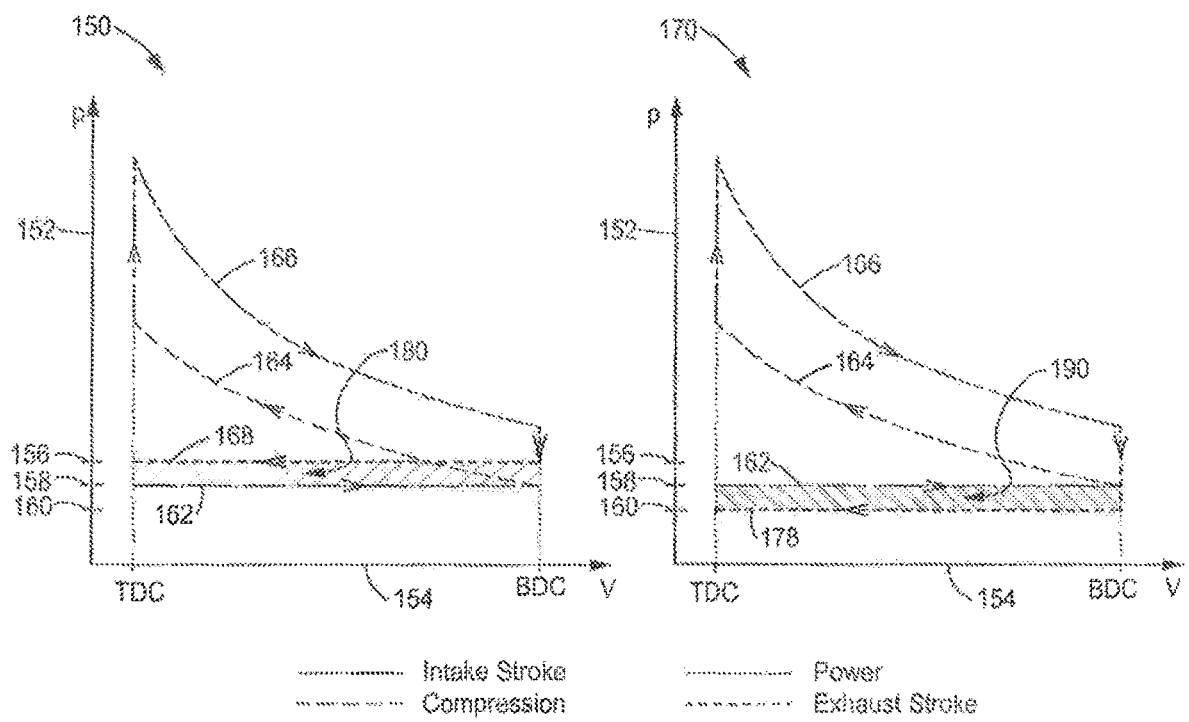
FIG. 1B depicts two pressure-volume graphs, in accordance with an embodiment of the present disclosure.

FIG. 1B depicts the pressure-volume (p-v) graphs 150 and 170, in accordance with an embodiment of the present invention. The pressure volume graphs 150 and 170 each depict pressure values along the vertical axis 252 as compared to volume values along the horizontal axis 154 for two different operating conditions of an engine (e.g., the engine 140). In the graphs 150 and 170, the intake stroke 162 starts at the lower left of the graphs 150 and 170, increasing volume at a nearly constant pressure value 158 as the piston travels from top dead center (TDC) to bottom dead center (BDC). The compression stroke 164 reduces the volume and raises the pressure, and the power stroke 166 occurs during ignition and rapidly increases the pressure as the piston performs the work. In general, the area under the curves of a p-v diagram indicate the work that is being performed.

Comparing the exhaust stroke 168 of the graph 150 on the left side of FIG. 1B and the exhaust stroke 178 of the graph 170 on the right side of FIG. 1B, it can be seen that the graph 150 includes a negative pumping loop 180 and the graph 170 includes a positive pumping loop 190. This occurs because the exhaust stroke 168 occurs at a pressure value 156 that is higher than the pressure value 158 of the intake stroke 162, whereas the exhaust stroke 178 occurs at a pressure value 160 that is lower than the pressure value 158 of the intake stroke 162. The positive pumping loop that occurs because cylinder pressure during the intake stroke (e.g., 162) is higher than that of the exhaust stroke (e.g., 178) permits positive work to be done on the engine crankshaft during the gas exchange process.

Returning to the discussion of FIG. 1A along with that of FIG. 1B, locating the second fluid connection 118 at the point of low fresh air static pressure permits an increased efficiency on the engine air system 100. This reduces the negative pumping loop that drives EGR flow in typical EGR systems. In some embodiments, locating the second fluid connection 118 at the trailing edge of the compressor wheel 106 provides for a positive pumping loop (e.g., the positive pumping loop 190) and increased efficiency for the engine system. Based on different operating conditions, a typical EGR system may not always have sufficient differential pressure to drive EGR. This may occur when operating at low end torque conditions. Typical EGR systems may employ exhaust restrictions or intake depressions to achieve the desired differential pressure to drive the EGR. In some embodiments of the present disclosure, an EGR control valve 120 is used to provide a sufficient differential pressure to drive EGR flow.

Further, introduction of the EGR flow at the trailing edge of the compressor wheel 106 eliminates potential damage that may occur due to droplets (e.g., water condensate, unburned diesel fuel, oil, or exhaust gas particulates) impacting the compressor wheel 106 when EGR flow is fed prior to the compressor inlet (e.g., upstream of the compressor and a location with a low static pressure). Unburned hydrocarbons (aka Diesel soot) may also cause impeller fouling and the like if added upstream of the compressor wheel 106.

In the various embodiments described herein, the EGR flow may be aligned with the fresh air flow to minimize losses and disturbances caused by mixed flow. This alignment enables a uniform flow field between the fresh air flow and the EGR flow. A turbocharger compressor EGR volute—discussed more fully below—may be used to realize the aligned and uniform flow between the fresh air flow and the EGR flow.

The EGR control valve 120 modulates the EGR rate by controlling the area ratio between the EGR flow path 114 and the turbine exhaust path 136. A prior art twin, or dual, volute housing should ideally support EGR rates between 0% and 50% with an EGR control valve disposed in one volute. However leakage of these systems limits the upper end to between 37% and 45%. The EGR control valve 120 is configured to provide improved sealing—discussed more fully below—of the EGR flow path and the turbine exhaust path, thus permitting controlling the EGR rates to be near 0%, near 50% EGR flow, and at any rate between 0% and 50%.

In various embodiments herein, the position of the EGR control valve 120 may be controlled based on a control signal or control signals received by an engine control unit (ECU). A typical ECU monitors engine conditions through signal connections to various sensors, such as mass air flow sensors, throttle position sensors, exhaust temperature and pressure sensors, and the like. An ECU may be implemented programmatically or by direct electrical connection through integrated circuits, or by any combinations of methods as known by those with skill in the art.

The EGR control valve 120 may further include a valve position indication system configured to determine the valve position of the EGR control valve, which may be used to determine the EGR flow rate. In some embodiments, at a given intermediate position of the EGR control valve 120, the EGR rate may vary based on the speed of the engine 140. For example, at an engine speed of 1,000 revolutions per minute (rpm), the engine air system 100 may have an EGR rate of 35%, and at an engine speed of 1,200 rpm the engine air system 100 may have an EGR rate of 10%. The engine air system 100 may further include an EGR pressure sensor 130 configured to detect and output an exhaust gas pressure. In some embodiments, various operating characteristics (e.g., rotational speed) of the turbocharger 102 may be controlled based on the position of the EGR control valve 120 and the pressure of the exhaust gas.

During low-heat conditions, e.g. cold-start and idle, the exhaust after-treatment system 138 may not have sufficient heat to eliminate the emission of $NO_x$ gasses generated during combustion in the engine 140. Driving EGR provides a method of reducing $NO_x$ formation by displacing oxygen from the inlet air provided to the engine 140. The EGR control valve 120 permits driving EGR by obstructing, or blocking, a portion of the flow path to the turbine 108 (e.g., via the turbine exhaust path 136) and diverting a portion of the exhaust gas to the compressor 104 (e.g., the EGR flow path 114). The displacement of oxygen can have significant effects on $NO_x$ formation during the combustion process. For example, at oxygen concentrations under 18%, a reduction of over three fourths of the $NO_x$ produced may be achieved, whereas at oxygen concentrations over 19%, a reduction of less than one half of $NO_x$ is realized. Thus, even a small amount of leakage may impede oxygen displacement and significantly raise the amount of $NO_x$ produced as compared to ideal non-leakage conditions.

During normal operating conditions, when the Selective Catalyst Reduction System is at operating temperature, the exhaust after-treatment system 138 efficiently removes $NO_x$ from the exhaust gas by various high-temperature dependent chemical reactions. Thus, the EGR rate may be lowered under these conditions as the exhaust after-treatment system 138 is able to remove the gasses produced.

It is envisioned that in some embodiments, responsive to detecting a failure or fault of the exhaust after-treatment system 138 (e.g., the depletion of urea, an indication of failure to remove $NO_x$ from the exhaust), the EGR control valve 120 may operate to raise the EGR rate even under normal operating conditions. The increase of the EGR rate causes a reduction in the formation of $NO_x$ gasses in the engine 140, albeit at a reduction in efficiency of the overall system. The increased EGR rate thus permits the engine air system 100 to maintain a low level of $NO_x$ in its output to the environment even in the event of a failure in the exhaust after-treatment system 138.

In some embodiments, the EGR flow path 114 includes the EGR cooler 124 between the EGR control valve 120 and the second fluid connection 118. When the exhaust air flows through the EGR cooler flow path 122, the EGR cooler 124 reduces the temperature of the exhaust gas in the EGR flow path 114 before re-introduction into the engine 140. In some embodiments, the EGR flow path 114 includes an EGR cooler bypass 126 that provides a parallel flow path 128 to the EGR cooler flow path 122. Control of exhaust through either the EGR cooler flow path 122 or the parallel flow path 128 may be realized by the EGR cooler control valve 142.

In some embodiments, the exhaust system further includes a wastegate 132. The wastegate 132 provides for a parallel flow path around the turbine 108. The wastegate 132 provides a means of discharging energy from the exhaust gas as an alternative to providing energy to the turbine wheel 110 of the turbine 108. Flow of exhaust gas through the wastegate 132 is typically introduced downstream of the turbine 108 and upstream of the exhaust after-treatment system 138. This serves to limit the turbocharger 102 speed, intake manifold pressure, and air mass flow. Control of the speed of the turbocharger 102 may be based at least in part on a valve position of the wastegate 132.

Figure 2A:
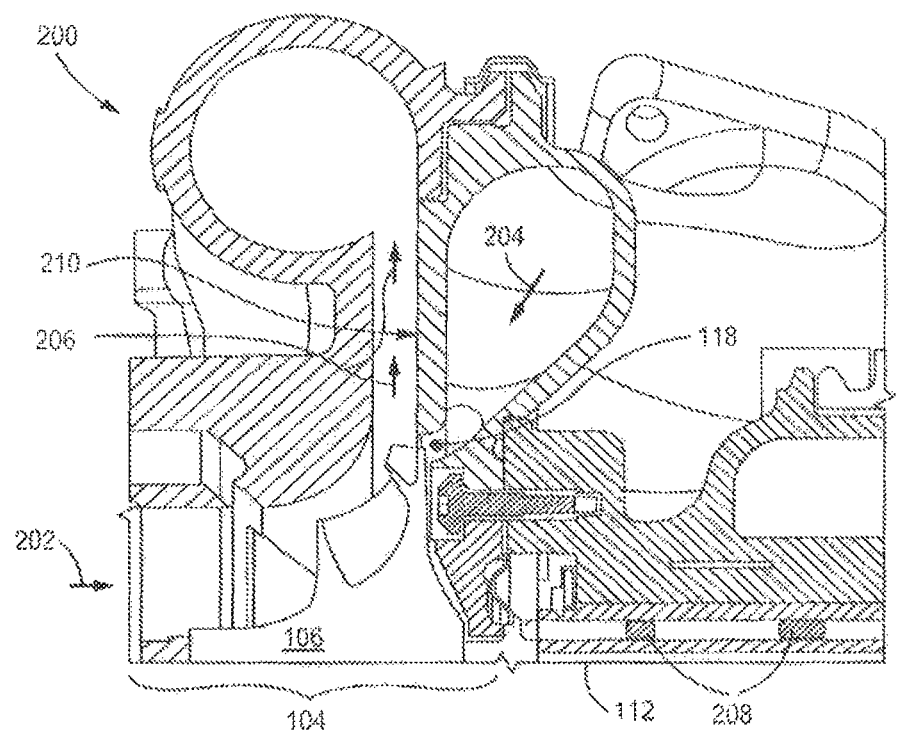
FIG. 2A depicts a cross-sectional view of a turbocharger compressor, in accordance with an embodiment of the present disclosure.

FIG. 2A depicts a cross-sectional view of an exemplary turbocharger compressor, in accordance with an embodiment of the present disclosure. In particular, FIG. 2 depicts the cross-sectional view 200 showing fresh air flow 202 entering into the compressor 104. The compressor wheel 106 compresses the fresh air flow along the vanes of the compressor wheel 106. The fresh air flow exits the compressor wheel 106 at its trailing edge, in proximity to the second fluid connection 118. Simultaneously, EGR flow 204 is provided from the engine 140 exhaust via the EGR flow path 114 to the compressor 104 at the second fluid connection 118. The fresh air flow 202 is combined with the EGR flow 204 at the second fluid connection 118. The combined flow 206 proceeds through the diffuser 210 to the engine 140.

As a convention used throughout for the position of the EGR control valve 120, a first position refers to when the path between the exhaust manifold 134 and the EGR flow path 114 is closed. A second position refers to when the path between the exhaust manifold 134 and the turbine exhaust path 136 is closed. An intermediate position refers to when the EGR control valve 120 is positioned to provide a dual path from the exhaust manifold 134 to both the EGR flow path 114 and the turbine exhaust path 136. Thus, when in either a second position or an intermediate position, the EGR control valve 120 may be referred to being in an EGR position as at least some of the engine manifold flow 135 is configured to be directed to the EGR flow path 114.

Figure 2B:
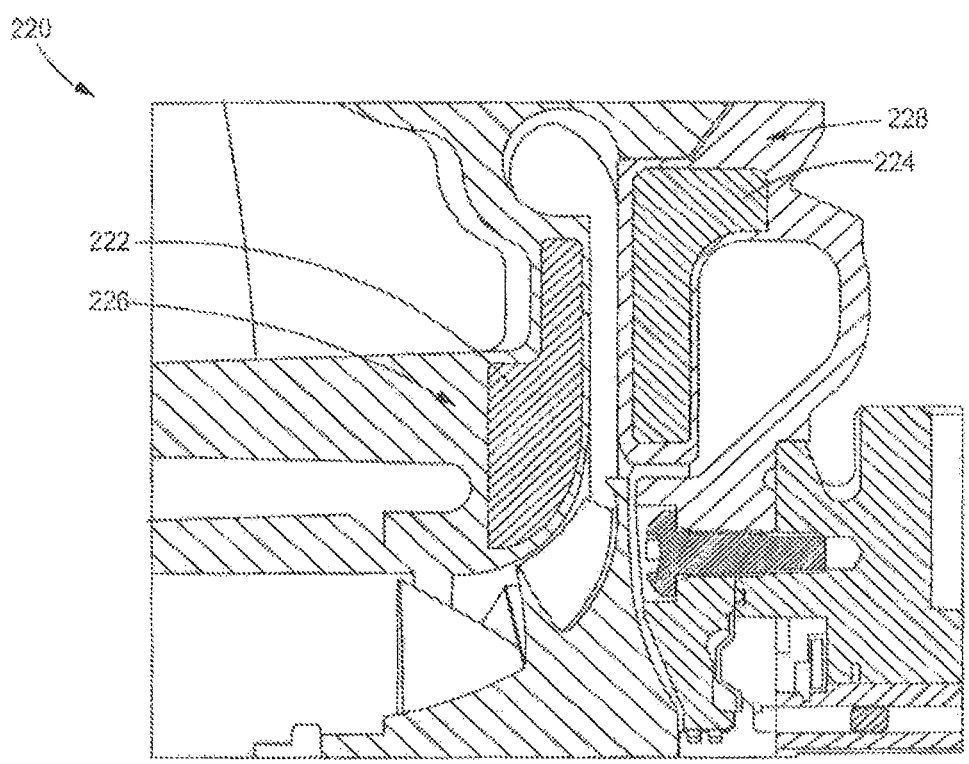
FIG. 2B depicts a cross-sectional view of a turbocharger compressor having a cooling circuit, in accordance with an embodiment of the present disclosure.

FIG. 2B depicts a cross-sectional view of a turbocharger compressor having a cooling circuit, in accordance with an embodiment of the present disclosure. In particular, FIG. 2B depicts the cross-sectional view 220 that is similar to the cross-sectional view 200 of FIG. 2A. As presented in FIG. 2B, the compressor housing 226 includes a compressor-housing cooling circuit 222 and the compressor backplate 228 includes a compressor-backplate cooling circuit. In various embodiments, the turbocharger may include either one or both of the compressor-housing cooling circuit 222 and the compressor-backplate cooling circuit 224. The compressor-housing cooling circuit 222 and the compressor-backplate cooling circuit 224 are configured to remove heat from gasses prior to exiting the compressor housing. The cooling circuits (222, 224) may be cooled by any appropriate coolant fluid. In some embodiments, turbochargers having either one or both of the compressor-housing cooling circuit 222 and the compressor-backplate cooling circuit 224 may be able to operate without an EGR cooler 124, or a reduced-size/reduced-cooling capacity EGR cooler 124. Such cooling circuits may permit reduction of engine costs and enable smaller and more light-weight packaging of the overall turbocharger system.

Figure 3A:
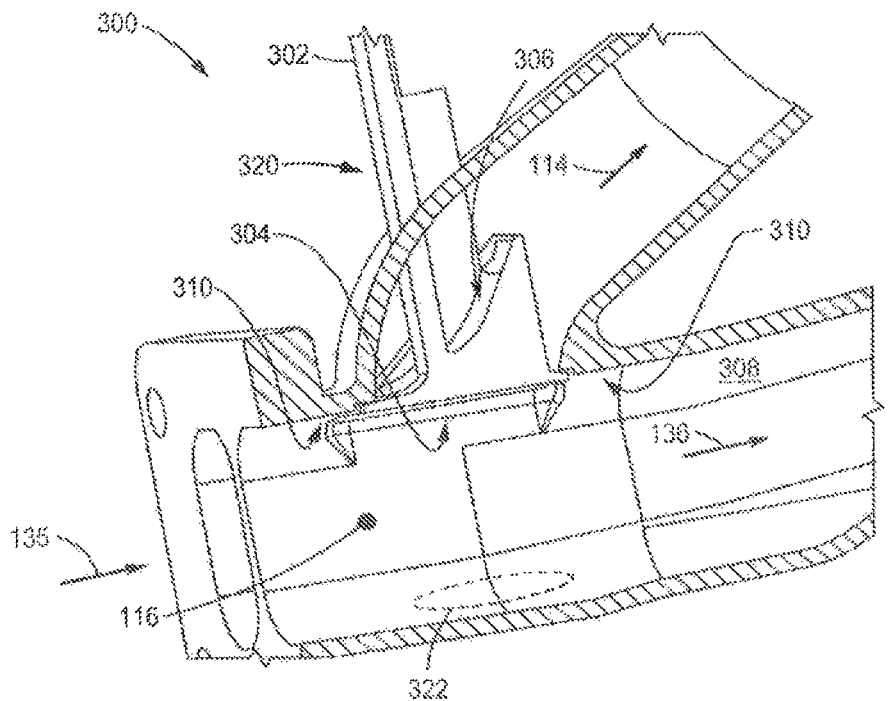
FIG. 3A depicts a cross-sectional view of a first EGR control valve, in accordance with an embodiment of the present disclosure.
Figure 3B:
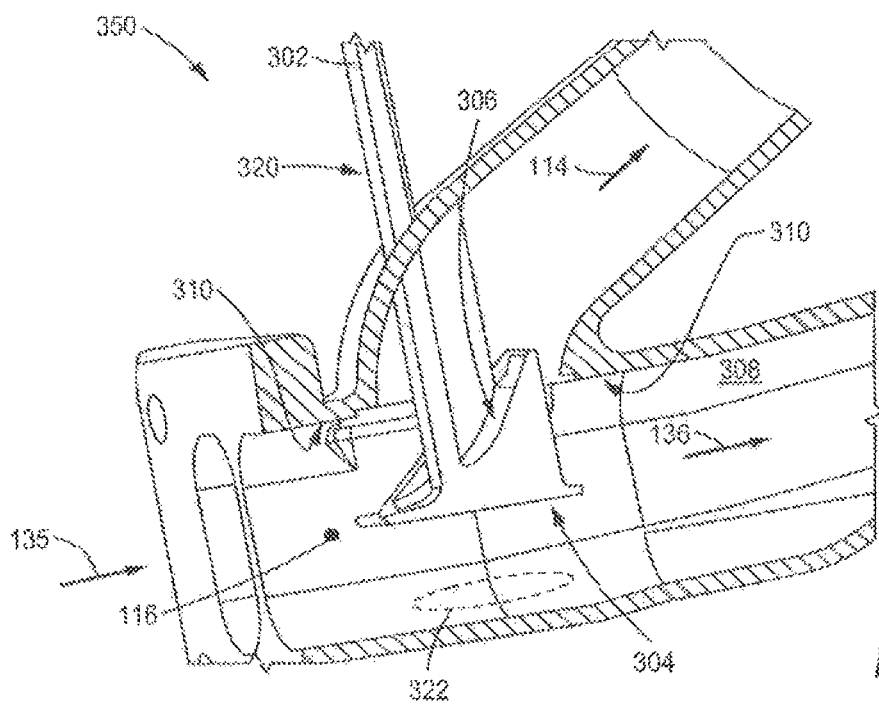
FIG. 3B depicts a cross-sectional view of the first EGR control valve, in accordance with an embodiment of the present disclosure.

FIG. 3A depicts a cross-sectional view of a first EGR control valve in a first position, and FIG. 3B depicts a cross-sectional view of the first EGR control valve in an intermediate position, in accordance with embodiments of the present disclosure. In particular, FIG. 3A depicts the cross-sectional view 300 of the scoop valve 320, which may act as the EGR control valve 120 of FIG. 1. FIG. 3B depicts the cross-sectional view 350 of the scoop valve 320 in an intermediate position. The view 300 depicts the scoop valve 320 being situated in a turbine volute 308. Engine manifold flow 135 from the engine 140 is received from the exhaust manifold 134 on the left. At the first fluid connection 116, the engine manifold flow 135 is directed towards the EGR flow path 114, the turbine exhaust path 136, or both, based on the position of the scoop valve 320.

The scoop valve 320 includes a first surface 304 that has a predominantly flat surface configured to align with a housing wall 310 of the turbine volute 308 when in a first position that seals the EGR flow path 114, as depicted in the view 300. In some embodiments, the turbine volute 308 is integrated into a housing of the turbine 108.

The scoop valve 320 further includes a concave surface 306 that is configured to guide the engine manifold flow 135 to the EGR flow path 114 when in an intermediate position, as depicted in the view 350, or in a second position (not depicted). The concave surface 306 is located on a second surface that is opposite the first surface and is curved to guide the engine manifold flow 135 to the EGR flow path 114 while minimizing disturbances and entropy production. The slope of the concave surface 306 may be configured to initially align with engine manifold flow 135, and slightly curve to provide alignment with the EGR flow path 114.

While the views 300 and 350 depict the scoop valve 320 in a first position (e.g., fully raised and the EGR flow path 114 sealed), and an intermediate position (e.g., partially lowered and flow available to both the turbine exhaust path 136 and the EGR flow path 114), it is appreciated that the position of the scoop valve 320 in a fully lowered position may seal the turbine exhaust path 136. In such a second position, the first surface 304 is adjacent to a bottom surface 322 of the turbine volute 308. The scoop valve 320 is positioned by a linear motion actuator 302. A position of the scoop valve 320 may be obtained by the linear motion actuator 302 for use in determining the EGR rate and monitoring and controlling the turbocharger performance.

Figure 4A:
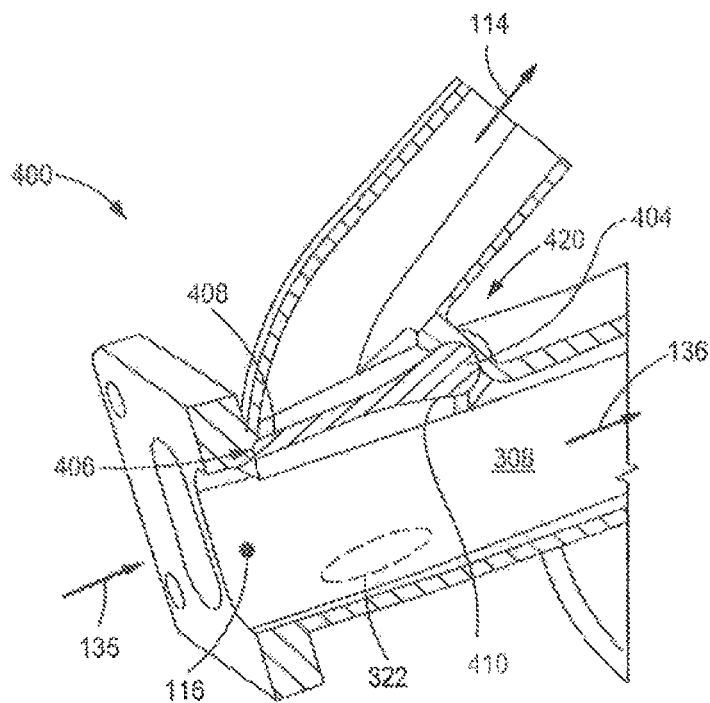
FIG. 4A depicts a cross-sectional view of a second EGR control valve, in accordance with an embodiment of the present disclosure.
Figure 4B:
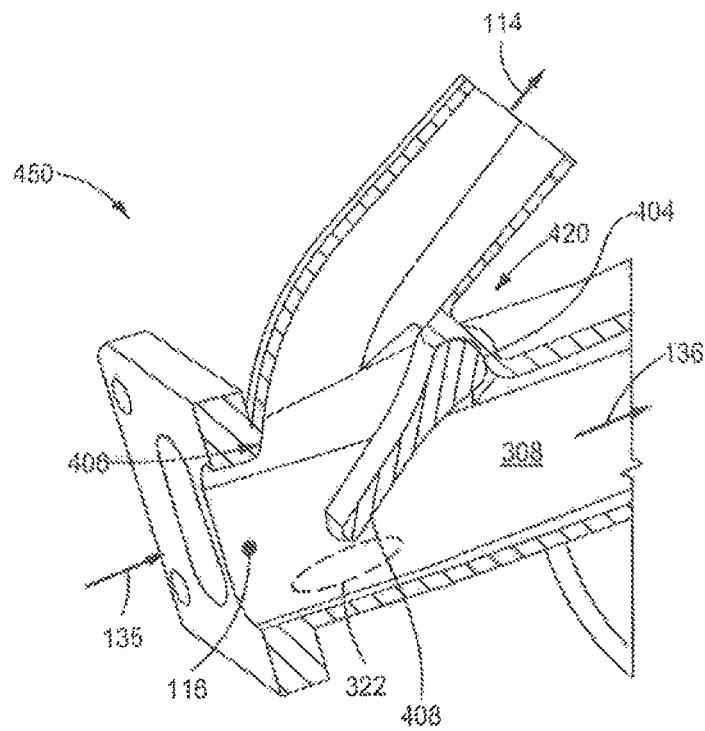
FIG. 4B depicts a cross-sectional view of a second EGR control valve, in accordance with an embodiment of the present disclosure.

FIG. 4A depicts a cross-sectional view of a second EGR control valve in a first position, and FIG. 4B depicts a cross-sectional view of the second EGR control valve in an intermediate position, in accordance with embodiments of the present disclosure. In particular, FIG. 4A depicts the cross-sectional view 400 of the flapper valve 420, which may act as the EGR control valve 120 of FIG. 1. FIG. 4B depicts the cross-sectional view 450 of the flapper valve 420 in an intermediate position. Similar to the scoop valve 320, the flapper valve 420 is disposed in the turbine volute 308. Engine manifold flow 135 from the exhaust manifold 134 enters on the left. At the first fluid connection 116, the engine manifold flow 135 is permitted to flow to the EGR flow path 114, the turbine exhaust path 136, or both, based on the position of the flapper valve 420.

In the view 400, the flapper valve 420 is in a first position that seals the EGR flow path 114. The flapper valve includes a rotary actuator 404 at a proximal end 410. The distal end 408 of the flapper valve 420 is configured to mate with a recess 406 in the turbine volute 308 when in a sealed position that blocks the EGR flow path 114. The view 450 depicts the flapper valve 420 in an intermediate position that permits a portion of the exhaust gas from the exhaust manifold 134 to flow to the EGR flow path 114 and the remainder to flow to the turbine exhaust path 136. The flapper valve 420 may also be positioned to a second position that blocks the flow to the turbine exhaust path 136. In such a second position, the flapper valve 420 is rotated such that the distal end 408 may be against the bottom surface 322 of the turbine volute 308. The flapper valve 420 is positioned by the rotary actuator 404, which may also provide a position indication of the flapper valve 420 for determining an EGR rate and monitoring and control of the turbocharger performance.

Figure 5A:
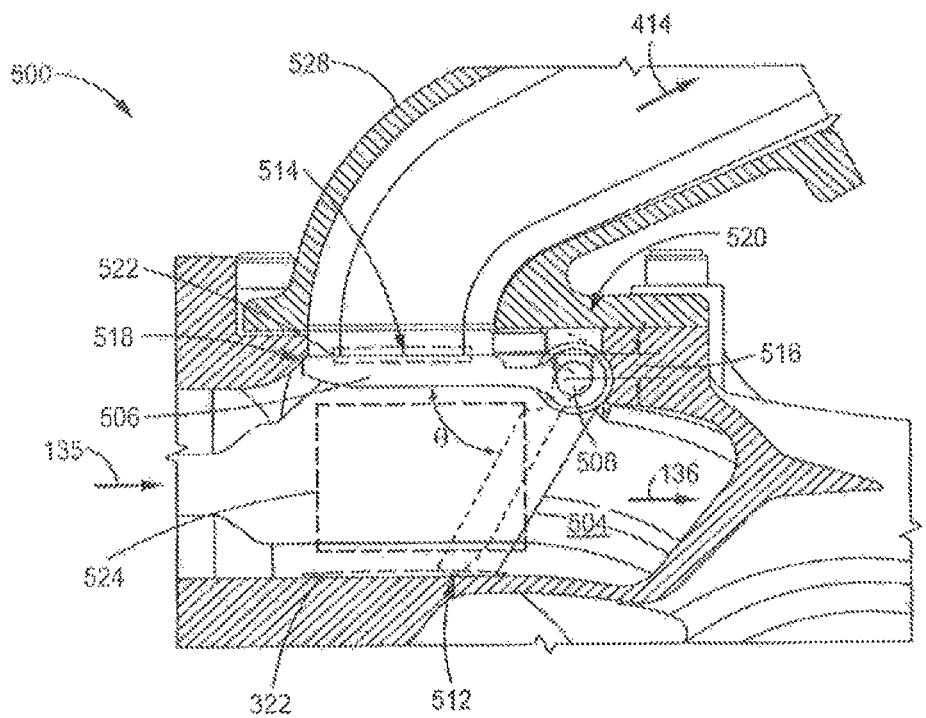
FIG. 5A depicts a cross-sectional view of a third EGR control valve, in accordance with an embodiment of the present disclosure.
Figure 5B:
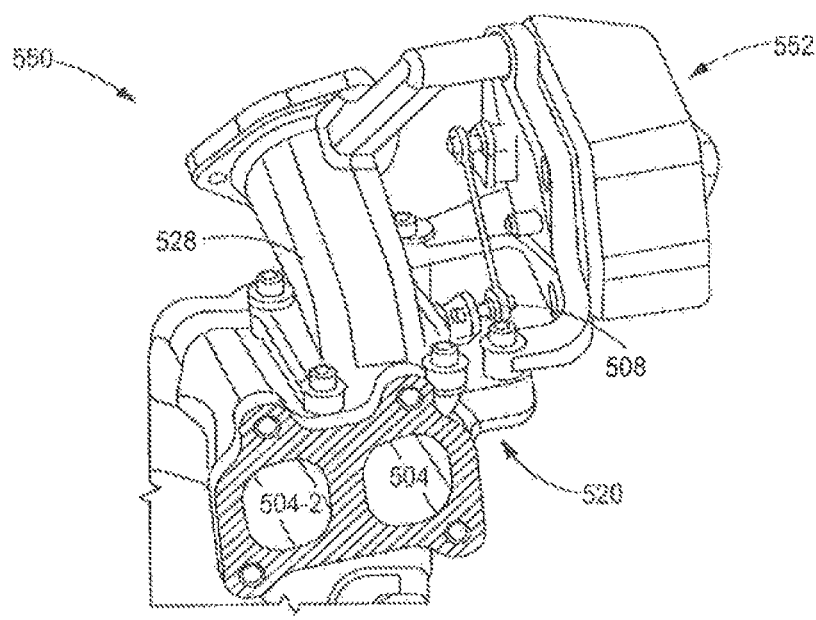
FIG. 5B depicts a perspective view of the third EGR control valve installed in a turbocharger system, in accordance with an embodiment of the present disclosure.

FIG. 5A depicts a cross-sectional view of a third EGR control valve, in accordance with an embodiment of the present disclosure. In particular, FIG. 5A depicts the cross-sectional view 500 of the EGR control valve 520. FIG. 5B depicts a perspective view of the third EGR control valve installed in a turbocharger system, in accordance with an embodiment of the present disclosure. In particular, FIG. 5B depicts the perspective view 550 that depicts many of the same components as the cross-sectional view 500. As shown in FIG. 5B, the EGR control valve 520 is disposed on the turbine volute 504. The view 550 depicts the EGR control valve 520 without the exhaust manifold 134 attached. The turbocharger depicted is a twin volute turbocharger, with a second volute 504-2 positioned adjacent and parallel to the turbine volute 504. The second volute 504-2 provides a flow path that is parallel to the turbine volute 504. An EGR outlet duct 528 is mateable (e.g., bolts, screws, adhesives) with the turbine volute 504 over the turbine volute opening 522. An operator 552 (e.g., an electric actuator) is operationally coupled to the rotational drive mechanism 508.

While the present discussion relates to the full range of EGR rates being between 0% and 50%, that is based on a twin volute design with a single EGR control valve disposed in one turbine volute. Other EGR rates may be achieved with other designs, such as a single turbine volute with a single EGR control valve, a dual turbine volute with two EGR control valves, and the like.

Returning to the discussion of FIG. 5A, the EGR control valve 520 may be used as the EGR control valve 120 in the engine air system 100. Similar to the EGR control valves 320 and 420, the EGR control valve 520 divides the engine manifold flow 135 between the EGR flow path 114 and the turbine exhaust path 136. Here, the EGR control valve 520 is disposed over the turbine volute opening 522 of the turbine volute 504. A sealing flap 506 is operationally connected to a rotational drive mechanism 508 at a proximal end 510. The rotational drive mechanism 508 causes the sealing flap 506 to sweep across the turbine volute 504. As depicted in the view 500, the EGR control valve 520 may be referred to being in the first position, with the EGR flow path 114 sealed. The dotted-line representation of the sealing flap 506 depicts the EGR control valve in the second position.

By way of reference, the EGR control valve 520 may provide for a 0%, or near 0%, EGR rate by sealing the turbine volute opening 522, as depicted in the view 500. In this first position, the sealing flap 506 may be referred to being at a valve position of zero degrees and be parallel with the engine manifold flow 135. To achieve an EGR rate of 50%, the EGR control valve 520, installed in a twin or dual volute housing, may be in a second position (such as that depicted by the dotted-line representation of the sealing flap 506) that blocks flow to the turbine exhaust path 136. In this second position, the sealing flap 506 may have its distal end 512 positioned against the bottom surface 322 and have a valve position of approximately 50 degrees, as indicated by the angle θ. However, it is envisioned that different sizes of the turbine volute opening 522 and heights of the turbine volute 504 may result in other valve position angles when in the second position.

It is further envisioned that the EGR control valve 520 may be positioned at an intermediate position to divide flow between the EGR flow path 114 and the turbine exhaust path 136 to achieve various intermediate EGR rates. In such a position, the sealing flap 506 may be positioned at any intermediate position between the first and second positions.

The sealing flap 506 includes a sealing surface 514 having rounded edges 526. The sealing flap 506 is detailed in the views 600 and 700 of FIGS. 6 and 7, respectively, below. The rounded edges 526 are configured to seal against (e.g., mate) with a chamfered edge 518 of the turbine volute opening 522. A center of the rotational drive mechanism 508 is located at a vertical offset 516 from the location of the chamfered edge 518.

Further, the side walls of the turbine volute 504 may include machined walls 524. In one embodiment, the turbine volute 504 is a cast or forged piece. Additional machining may be performed on the interior sealing surfaces of the turbine volute 504, for example, on the side walls, to provide a smoother surface and a more accurate dimension to more precisely fit the width, w, of the sealing flap 506. Sealing of the turbine exhaust path 136 may be improved by providing a tighter seal between sides 540 of the sealing flap 506 and the machined walls 524 of the turbine volute 504. Machining of the side walls may be accomplished via access from the turbine volute opening 522 when the EGR outlet duct 528 is not attached to the turbine volute 504.

The vertical offset 516 is realized at least in part because of the recess 530 located between the rotational drive mechanism 508 and the sealing surface 514. The combination of the rounded edges 526 on the sealing flap 506 and the chamfered edge 518 of the turbine volute opening 522 permit sealing under various temperature, and thermal expansion, conditions and provide for sealing of the turbine volute opening 522 in light of tolerance stack-up of various components. An additional benefit of providing the vertical offset 516 is a more uniform initial lift off from a closed position (e.g., a zero degree position).

Figure 6:
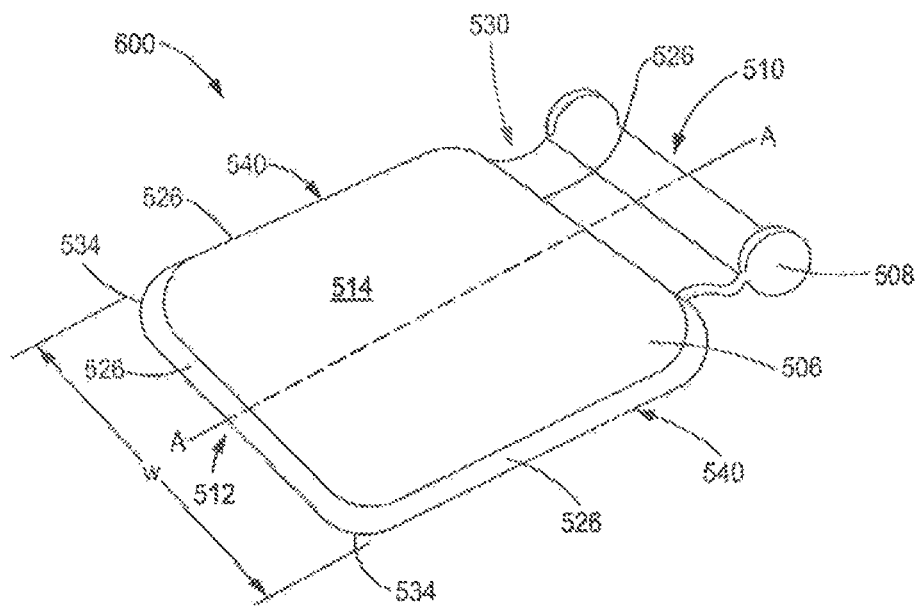
FIG. 6 depicts a perspective view of a sealing flap of the third EGR control valve, in accordance with an embodiment of the present disclosure.
Figure 7:
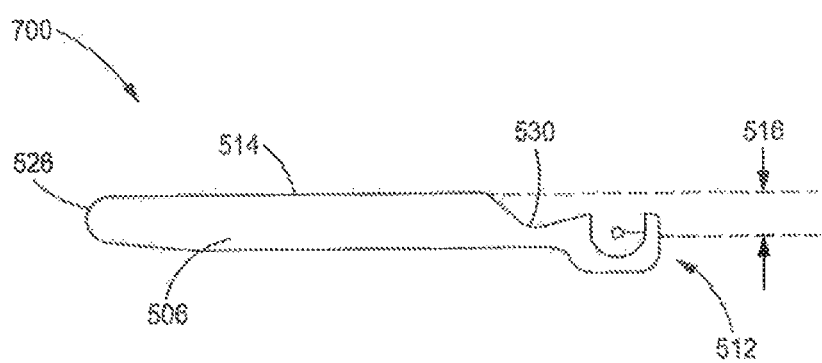
FIG. 7 depicts a cross-sectional view of the sealing flap of FIG. 6 along the line A-A, in accordance with an embodiment of the present disclosure.

FIG. 6 depicts a perspective view of a sealing flap of the third EGR control valve, and FIG. 7 depicts a cross-sectional view of the sealing flap of FIG. 6 along the line A-A, in accordance with an embodiment of the present disclosure. In particular, FIG. 6 depicts the perspective view 600 of the sealing flap 506 and FIG. 7 depicts the cross-sectional view 700 of the sealing flap 506 along the line A-A of FIG. 6.

The rotational drive mechanism 508 is configured to attach to the sealing flap 506 at the proximal end 510. The edges of the sealing surface 514 include rounded edges 526 for mating with and sealing against the chamfered edge 518 of the turbine volute opening 522 when the EGR control valve is at a first position (e.g., 0 degrees).

At the distal end 512, the corners of the sealing surface may include rounded corners 534. The rounded corners 534 may be configured to mate with fillets 536 (depicted in FIG. 8) in the turbine volute 504 when in the second position (e.g., 50 degrees). The rounded corners 534 may be sized to have a radius just under a radius measurement of the fillets 536. For example, the radius of the rounded corners 534 may be sized between 50-2,500 microns under the radius of the fillets 536. The sides 540 of the sealing flap 506 extend between the proximal end 510 and the distal end 512.

Figure 8:
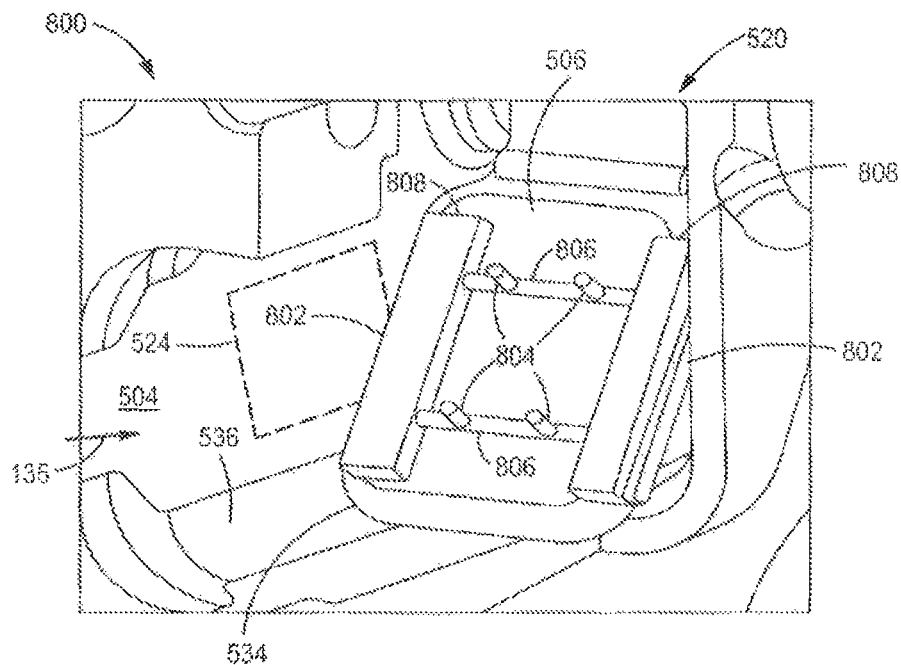
FIG. 8 depicts a perspective view of an EGR control valve sealing flap, in accordance with an embodiment of the present disclosure.
Figure 9:
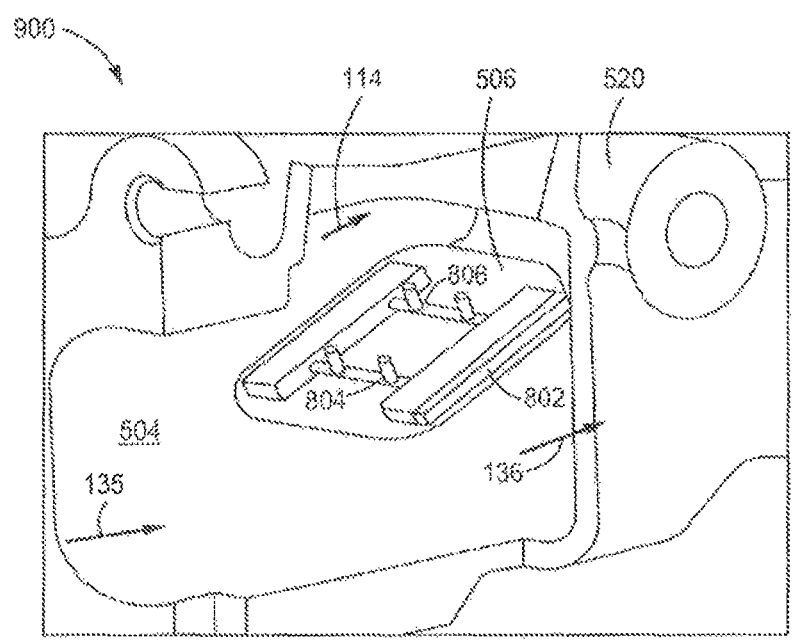
FIG. 9 depicts a perspective view of an EGR control valve sealing flap in an intermediate position, in accordance with an embodiment of the present disclosure.

FIG. 8 depicts a perspective view of an EGR control valve sealing flap in a second position and FIG. 9 depicts a perspective view of the EGR control valve sealing flap in an intermediate position, in accordance with embodiments of the present disclosure. In particular, FIG. 8 depicts the view 800 of the EGR control valve 520 with a partial cutaway of the turbine volute 504. FIG. 9 depicts the view 900, similar to the view 800, but with the EGR control valve 520 in an intermediate position. As depicted in the views 800 and 900, the sealing flap 506 may further includes a gas port 804 on the sealing surface 514 side of the sealing flap 506. The gas port 804 is fluidly connected, via fluid connections 806, to side seals 802. The side seals 802 are positioned within a cavity 808 in the sealing flap 506, and are permitted to translate in and out of the cavity 808 towards and away from the turbine volute side walls. The gas ports 804 may be preferentially located on the sealing surface 514 of the sealing flap 506 to obtain a desired pressure on the side seals 802.

When in a second position (e.g., valve position 50 degrees), pressure from the exhaust gas within the exhaust manifold 134 acts upon the gas ports 804. Because the gas ports 804 are fluidly connected to the side seals 802, the side seals 802 are pushed outward and towards the turbine volute 504 side walls, which may be the machined walls 524. Thus, the side seals 802 interact with the side walls to provide increased sealing of, and less leakage to, the turbine exhaust path 136. The improved sealing permits increased EGR rates by reducing leakage, thus reducing friction while maintaining a minimal aero clearance.

In view 900, the sealing flap 506 is in an intermediate position (e.g., valve position of approximately 25 degrees), thus the pressure felt on the gas port 804 is reduced as compared to the second valve position depicted in the view 800. As such, the side seals 802 are not pressed towards the side walls with as much force.

Figure 10:
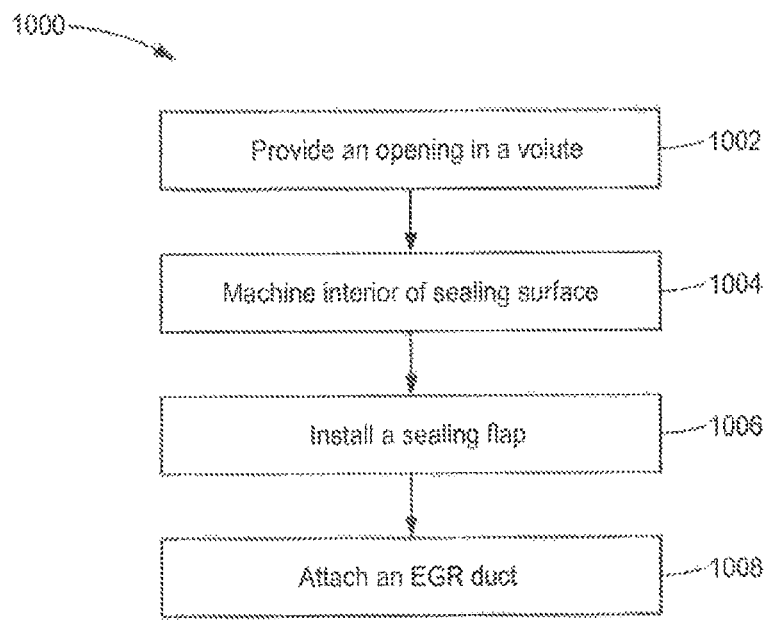
FIG. 10 depicts a method of assembling an EGR control valve, in accordance with an embodiment of the present disclosure.

FIG. 10 depicts a method of assembling an EGR control valve, in accordance with an embodiment of the present disclosure. In particular, FIG. 10 depicts the method 1000 for assembling an EGR control valve, such as the EGR control valve 520. The method includes providing an opening in a volute at block 1002, machining of the interior sealing surfaces at block 1004, installing a sealing flap at block 1006, and attaching an EGR duct to the opening at block 1008.

The method 1000 is described herein with the EGR control valve 520 discussed above. At block 1002, the turbine volute 504 is provided with the turbine volute opening 522. The turbine volute 504 includes interior sealing surfaces, such as the side walls. These side walls may be machined to provide a more accurate tolerance and a smoother surface to seal against with the sides of the sealing flap 506.

The machined walls 524 are configured to seal with the sides 540 of the sealing flap 506. At block 1004, the side walls of the turbine volute 504 are machined. Access to the interior of the turbine volute 504 for machining the side walls is provided via the turbine volute opening 522.

In some embodiments, machining the interior sealing surfaces of the turbine volute 504 includes machining the fillets 536. The fillets 536 are configured to seal with the rounded corners 534 of the sealing flap 506.

At block 1006, the sealing flap 506 is operationally connected to a rotational drive mechanism 508. The rotational drive mechanism 508 is disposed in the turbine housing and located at a vertical offset 516 from a seating surface (e.g., the chamfered edge 518 of the turbine volute opening 522). In some embodiments, the sealing flap 506 may be provided with side seals 802 in fluid connection with a gas port 804 on the sealing surface 514 side of the sealing flap 506. In such an embodiment, the sealing flap 506 with side seals 802 is installed.

At block 1008, the EGR outlet duct 528 is attached to the turbine volute opening 522. The attachment may be performed via fasteners, adhesives, and the like. The attachment may also be supplemented with gaskets to provide improved sealing between the exterior of the turbine volute 504 and the EGR outlet duct 528.

Figures 11A, 11B:
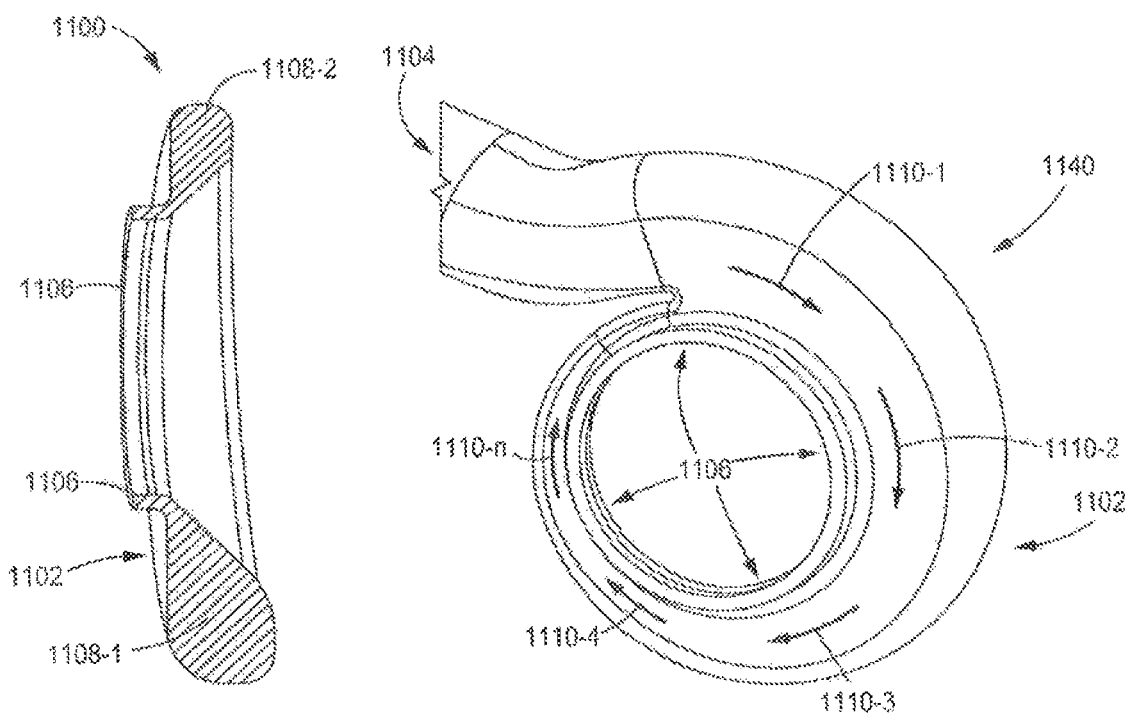
FIG. 11A depicts a cross-sectional view of a turbocharger compressor EGR volute, in accordance with an embodiment of the present disclosure.
FIG. 11B depicts a perspective view of the turbocharger compressor EGR volute, in accordance with an embodiment of the present disclosure.

FIG. 11A depicts a cross-sectional view of a turbocharger compressor EGR volute and FIG. 11B depicts a perspective view of the turbocharger compressor EGR volute, in accordance with an embodiment of the present disclosure. In particular, FIG. 11A depicts a cross-sectional view 1100 and FIG. 11B depicts the perspective view 1140 of the turbocharger compressor EGR volute 1102. The turbocharger compressor EGR volute 1102 may be used to provide EGR flow from the EGR control valve 120 to be mixed with fresh air from the compressor 104 for introduction to the engine 140. For example, the turbocharger compressor EGR volute 1102 may provide EGR flow at the second fluid connection 118 of FIG. 1 in the proximity to trailing edge of the compressor wheel 106.

The turbocharger compressor EGR volute 1102 includes an EGR inlet 1104 and an EGR outlet 1106. The flow path through the turbocharger compressor EGR volute 1102 may realize a decreasing cross-sectional area progression 1108. In some embodiments, the decreasing cross-sectional area progression 1108 exhibits a linear, or near-linear, decreasing cross-sectional area progression 1108 over a substantial portion of the spiral shaped flow path 1110 from the EGR inlet 1104 to the EGR outlet 1106. Thus, as EGR flow proceeds through the turbocharger compressor EGR volute 1102, it realizes decreased area as indicated by the areas 1108-1 and 1108-2 depicted in the view 1100.

The area 1108-1 at the bottom of the view 1100 depicts a representative cross section of the turbocharger compressor EGR volute 1102 near the EGR inlet 1104 (e.g., near the position 1110-1 along the spiral shaped flow path 1110). The area 1108-2 at the top of the view 1100 depicts a representative cross section of the turbocharger compressor EGR volute 1102 at a position further along the spiral shaped flow path 1110 from the EGR inlet 1104 (e.g., near the position 1110-4) and presents a smaller cross-sectional area than does the area 1108-1. As flow proceeds from the EGR inlet 1104 towards the EGR outlet 1106 along the spiral flow path (e.g., 1110-1, 1110-2, . . . 1110-N) it experiences a smaller cross-sectional areas as it exits the EGR outlet 1106 since a portion of the flow is exiting the turbocharger compressor EGR volute with each incremental section. The EGR outlet 1106 provides for an introduction of EGR flow to the trailing edge of the compressor wheel along a circumference of the compressor wheel 106.

Figure 11C:
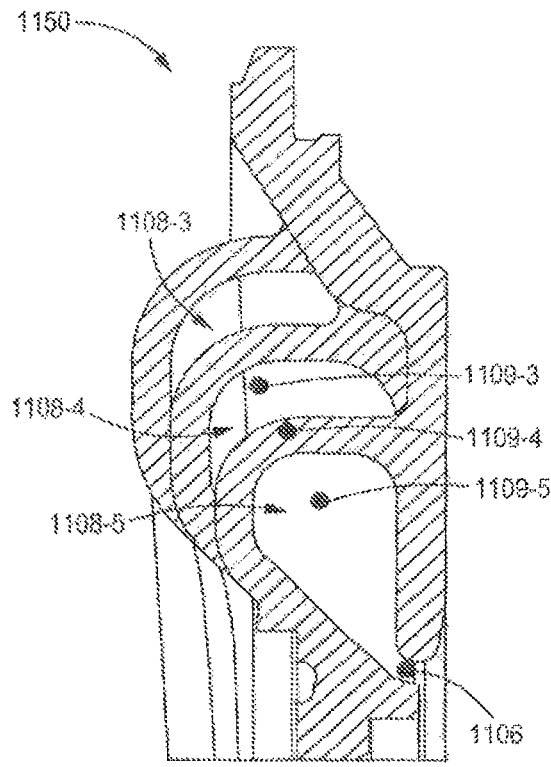
FIG. 11C depicts views of multiple cross-sections of the turbocharger compressor EGR volute overlaid over each other, in accordance with an embodiment of the present disclosure.

FIG. 11C depicts views of multiple cross-sections of the turbocharger compressor EGR volute overlaid over each other, in accordance with an embodiment of the present disclosure. In particular, FIG. 11C depicts the view 1150 having the cross-sectional areas 1108-3, 1108-4, 1108-5, each having a geometric center 1109-3, 1109-4, and 1109-5. In order of progression along the spiral shaped flow path

1110, the area 1108-3 represents an initial representative cross-sectional area, the area 1108-4 represents a subsequent representative cross-sectional area, and the area 1108-5 represents a further subsequent representative cross-sectional area, each with a smaller cross-sectional area than the preceding cross-sectional area.

The view 1150 also depicts the geometric centers 1109-3, 1109-4, and 1109-5 for each of the respective cross-sectional areas 1108-3, 1108-4, and 1108-5. Each geometric center, or centroid, represents an arithmetic mean position of all of the points of the cross-sectional area. Further, the general location of the EGR outlet 1106 is depicted in FIG. 11C.

Figure 11D:
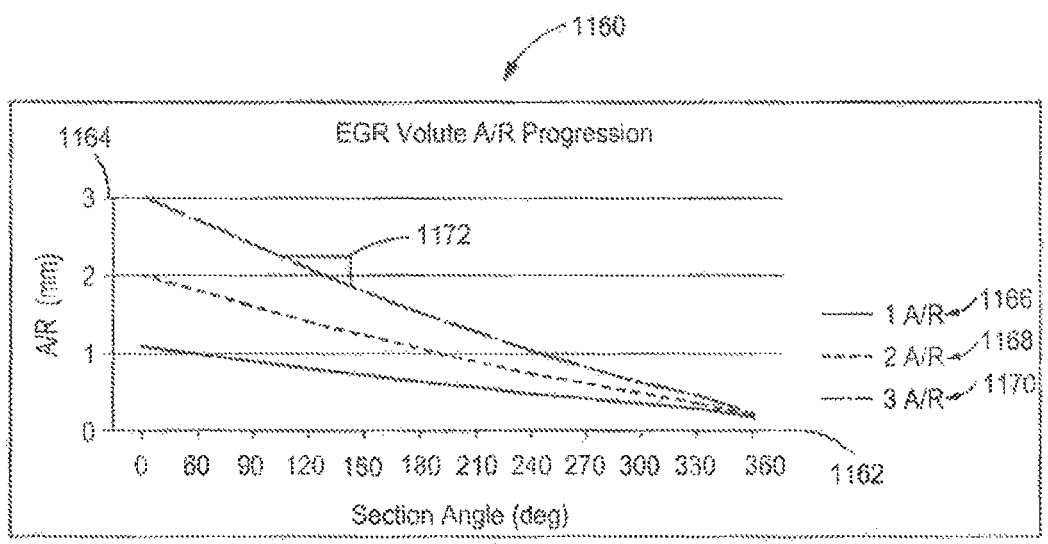
FIG. 11D depicts a graph of the area progression of the turbocharger compressor EGR volute, in accordance with an embodiment of the present disclosure.

FIG. 11D depicts a graph of the area progression of the turbocharger compressor EGR volute, in accordance with an embodiment of the present disclosure. In particular, FIG. 11D depicts the graph 1160 having a sectional angle along the x-axis 1162, an Area to Radius ratio (A/R) along the y-axis 1164. The sectional angle indicates the number of degrees along the spiral shaped flow path 1110. The A/R indicates a ratio of the value of a cross-sectional area of a cross-section (e.g., 1108-1) over a radius measured between a center of a compressor wheel (e.g., the center of the compressor wheel 106) and a respective geometric center of a cross-section. Dividing an area measurement (length squared) by a radius (length) produces a length measurement for the units of A/R.

The graph 1160 depicts three example area progressions 1166, 1168, and 1170. The first area progression 1166 initially starts with an A/R of 1 mm, which decreases along the spiral shaped flow path 1110 from 0 degrees to 360 degrees of sectional angle towards a value of 0 mm A/R. Similarly, the area progressions 1168 and 1170 initially start at 2 mm and 3 mm, respectively, at 0 degrees of sectional angle and decrease towards a 0 mm A/R at 360 degrees of sectional angle.

In some embodiments, the rate of decrease of A/R as it progresses along the sectional angle is linear, or near linear, over a substantial portion of the spiral shaped flow path 1110. For example, a section of the area progression 1170 depicted at 1172 exhibits a linear decrease of A/R for a given change of sectional angle.

The rate of A/R progression may be varied to change the angle of EGR flow being introduced at the trailing edge of the compressor wheel 106 in order to match an angle of fresh air flow exiting the compressor wheel 106, as described more fully below. Thus, in some embodiments, at or near the second fluid connection 118, the EGR flow is directed toward a direction of a fresh air flow at the compressor wheel.

Figure 12:
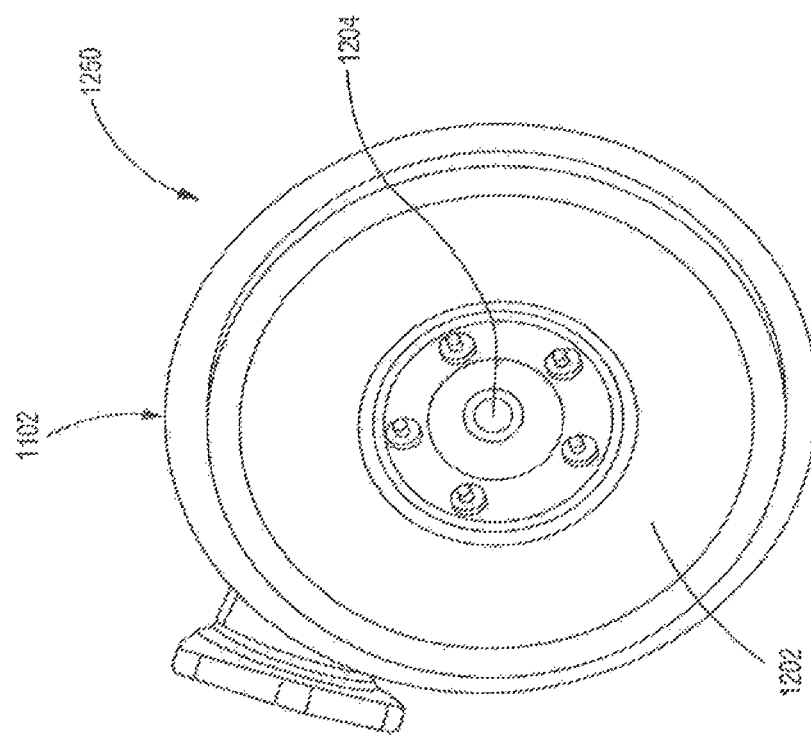
FIG. 12 depicts multiple views of a turbocharger compressor EGR volute with a backplate, in accordance with an embodiment of the present disclosure.
Figure 12:
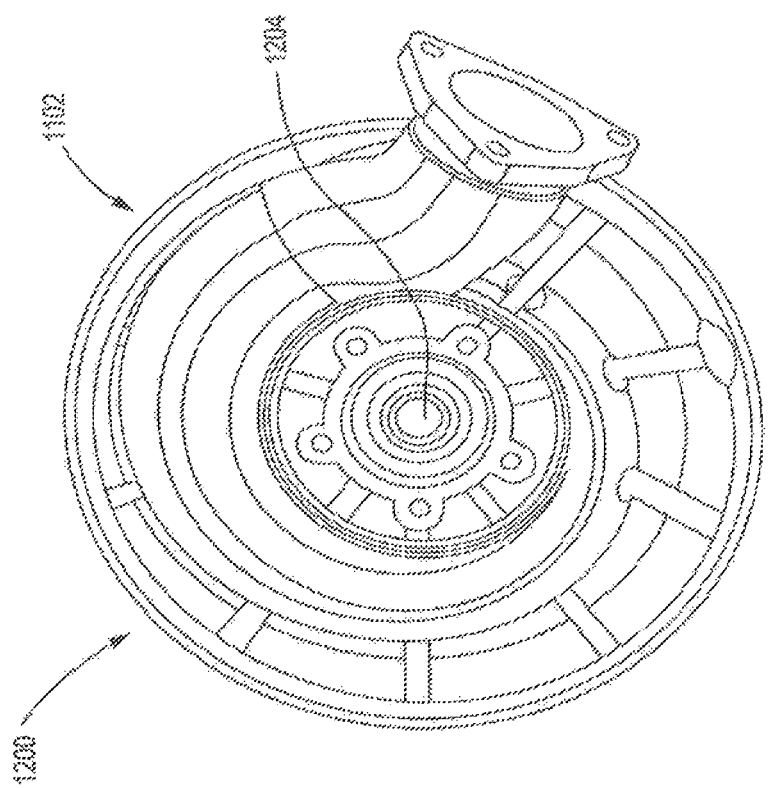

FIG. 12 depicts multiple views of a turbocharger compressor EGR volute with a backplate, in accordance with an embodiment of the present disclosure. In particular, FIG. 12 depicts the perspective view 1200 of the turbocharger compressor EGR volute 1102 and the perspective view 1250 depicts the turbocharger compressor EGR volute with the backplate 1202. The backplate provides for attachment of the turbocharger compressor EGR volute 1102 to a turbocharger housing and includes an opening 1204 for the common shaft 112. Example methods to attach the turbocharger compressor EGR volute 1102 to the turbocharger housing include bolts, screws, snaps, clamps, casting into the backplate 1202, and the like.

Figure 13:
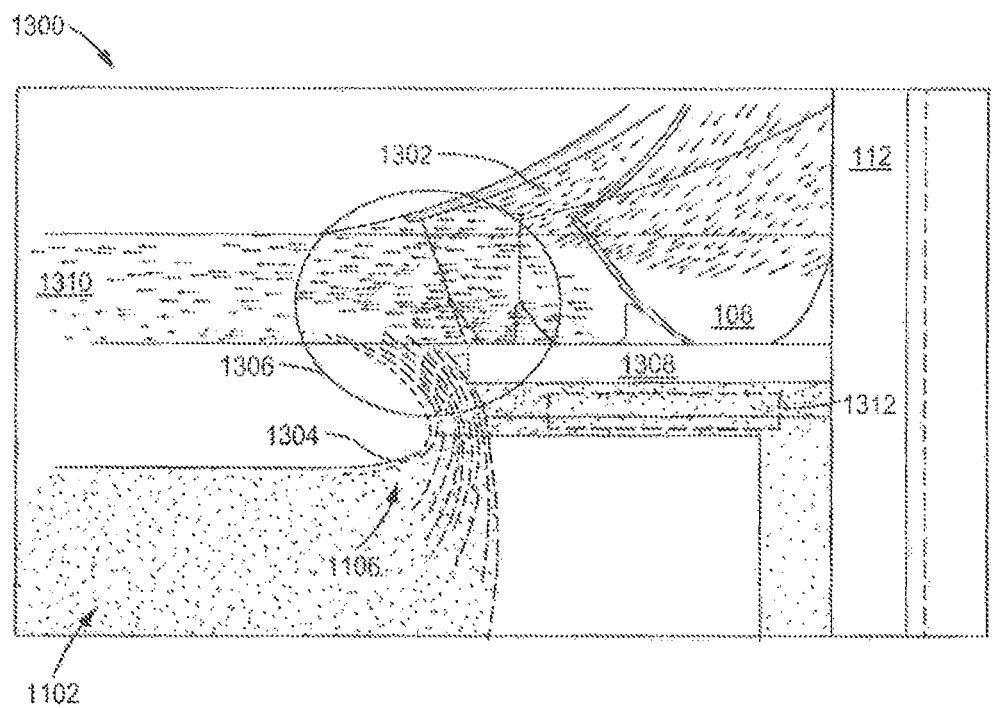
FIG. 13 depicts a cross-sectional view of a junction area of EGR flow and fresh air flow, in accordance with an embodiment of the present disclosure.

FIG. 13 depicts a cross-sectional view of a junction area of EGR flow and fresh air flow, in accordance with an embodiment of the present disclosure. In particular, FIG. 13 depicts the cross-sectional view 1300 of a junction area 1306. The junction area 1306 is where the EGR flow 1304 meets the fresh air flow 1302 and may also serve as the location of the second fluid connection 118 discussed in conjunction with the engine air system 100 of FIG. 1. As discussed above, the term fresh air is used to mean a combination of all fluids introduced to the inlet of the compressor 104, which may include low pressure EGR flow, PCV flow, ambient air flow, and the like.

The EGR flow 1304 is provided via the EGR outlet 1106 of the turbocharger compressor EGR volute 1102. The fresh air flow 1302 is provided via the rotating vanes of the compressor wheel 106. The fresh air flow 1302 combines with the EGR flow 1304 and proceeds through the diffuser 1310 to be introduced to the engine 140 for combustion. While a majority of the EGR flow 1304 is provided to the junction area 1306, a portion of the EGR flow 1304 may be directed, by the EGR outlet 1106, towards a back surface 1308 of the compressor wheel 106. This portion of EGR flow directed towards the back surface 1308 of the compressor wheel 106 provides a pressure towards the compressor wheel pocket 1312 and may provide for improved sealing along the common shaft 112. The EGR flow directed to the compressor wheel pocket 1312 may provide for increased pressure along the back surface 1308 of the compressor wheel 106, which reduces a pressure differential across oil seals disposed around the common shaft 112. This reduced pressure differential aids in reducing an amount of engine oil that may leak past seals disposed between the compressor wheel 106 and a bearing compartment, thereby limiting an amount of engine oil being introduced to the intake tract via the compressor wheel pocket 1312. The amount of flow directed towards the back surface 1308 may be adjusted based at least in part on a degree of overlap provided by the EGR outlet 1106 towards the back surface 1308 as compared to the portion of EGR flow 1304 provided to the junction area 1306.

Figure 14:
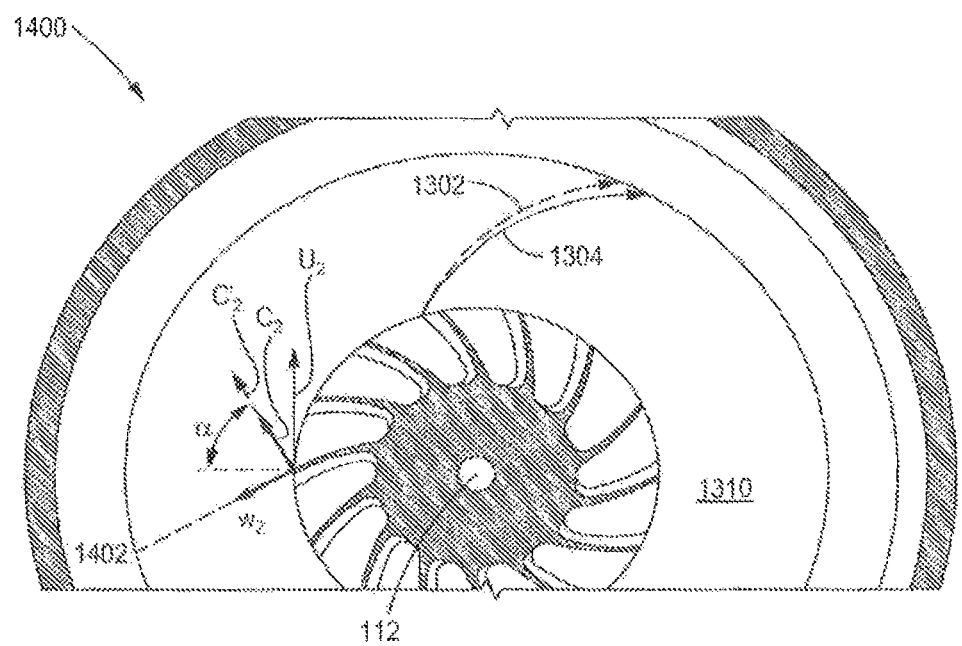
FIG. 14 depicts flow in a diffuser, in accordance with an embodiment of the present disclosure.

FIG. 14 depicts flow in a diffuser, in accordance with an embodiment of the present disclosure. In particular, FIG. 14 depicts a view 1400 of EGR flow 1304 and fresh air flow 1302 through the diffuser 1310. The EGR flow 1304 is distributed by the EGR outlet 1106 circumferentially about the compressor wheel 106. In some embodiments, the EGR flow 1304 is distributed equally around a circumference of the compressor wheel 106. As the fresh air is compressed by the blades of the compressor wheel 106, it receives momentum in a rotational direction ($U_2$) and in a radial direction ($W_2$). The vector $W_2$ is provided along an axis 1402 extending from each compressor wheel vane tip. As the mass flow rate of air increases, the magnitude of the vector $W_2$ increases. The vector $U_2$ is tangential to each compressor wheel edge. As the rotational speed of the compressor wheel 106 increases, the magnitude of the vector $U_2$ increases. The vectors $C_2$ and $C'_2$ indicate the combined velocity profiles of fluid flow for fresh air flow and EGR flow, respectively. These are achieved by summing the vectors $U_2$ and $W_2$ for the corresponding flow. The vectors $C_2$ and $C'_2$ each extend at a flow angle ($\alpha$). The flow may be aligned axially (e.g., into an out of the view 1400) by relative pressure between the EGR flow 1304 and the fresh air flow 1302.

In the various embodiments, it is assumed that the impeller geometry and the geometry of the turbocharger compressor EGR volute 1102 are fixed. Thus, the rotational speed of the compressor wheel 106 and the mass flow rate of the fresh air will determine the velocity profile of the fresh air flow 1302 at the trailing edge of the compressor wheel 106. As depicted in the view 1400, the fresh air flow 1302 is aligned with the EGR flow 1304, as indicated by the flow velocity profiles nearly overlapping each other.

Figure 15:
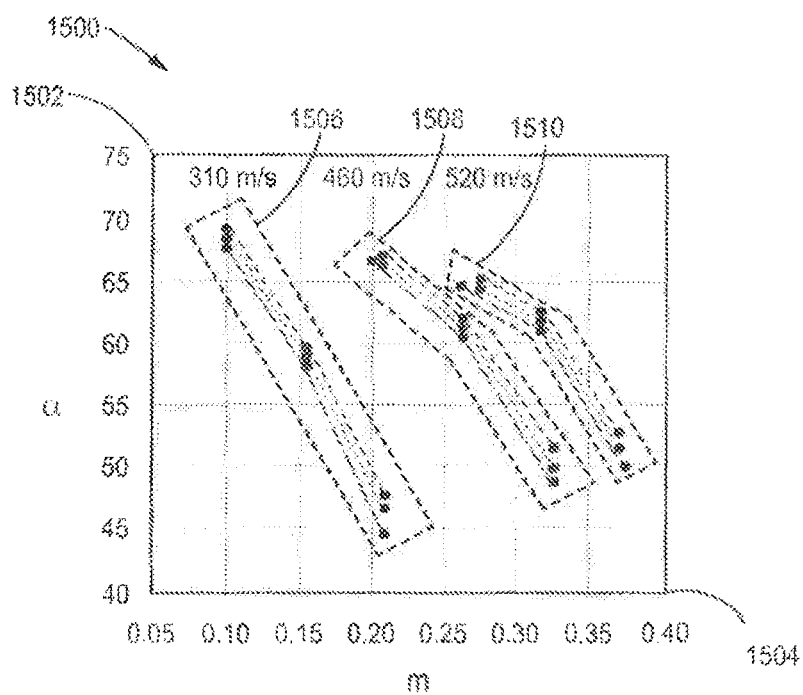
FIG. 15 depicts a graph of fresh air flow angles for various flow rates, in accordance with an embodiment of the present disclosure.

FIG. 15 depicts a graph of fresh air flow angles for various flow rates, in accordance with an embodiment of the present disclosure. In particular, FIG. 15 depicts the graph 1500 that includes the fresh air flow angle α along the vertical axis 1502 against and the mass flow rates along the horizontal axis 1504. The results are presented in three groups 1506, 1508, and 1510 for three different velocities. The group 1506 represents a low speed operation of the turbocharger, the group 1510 represents operations at rated power, and the group 1508 represents operating at an intermediate power. Each group includes the data points of three different EGR rates. The close grouping of the different EGR rate data indicates that the EGR rate has a minimal effect on the EGR exit flow angle. Throughout each of these three groups, the variation in the fresh air flow angle α is approximately 20 degrees for the range of mass flow rates for the group 1506, approximately 17 degrees for the group 1508, and approximately 15 degrees for the range of mass flow rates for the group 1510.

While the fresh air flow angle α varies with changing operating parameters, the EGR flow angle α is relatively constant for different operating parameters. This is because the turbocharger compressor EGR volute 1102 has a fixed cross-sectional area progression 1108 determined by its shape. As such, a geometry (e.g., the shape) of turbocharger compressor EGR volute 1102 may be designed to achieve an EGR flow angle α that will align with the fresh air flow angle α for the expected operating conditions for the engine 140 and turbocharger 102. The shape of the turbocharger compressor EGR volute 1102 may be changed to alter the rate of cross-sectional area progression 1108 to achieve a desired EGR flow angle α. For example, the shape of the turbocharger compressor EGR volute 1102 may be designed to provide an EGR flow angle that will align with typical fresh air flow from an engine air system that typically operates at cruising operating conditions, such as an engine air system for a truck. Examples of different shape geometries may include varying the rate of A/R progression, as discussed above with respect to the graph 1160.

Figure 16:
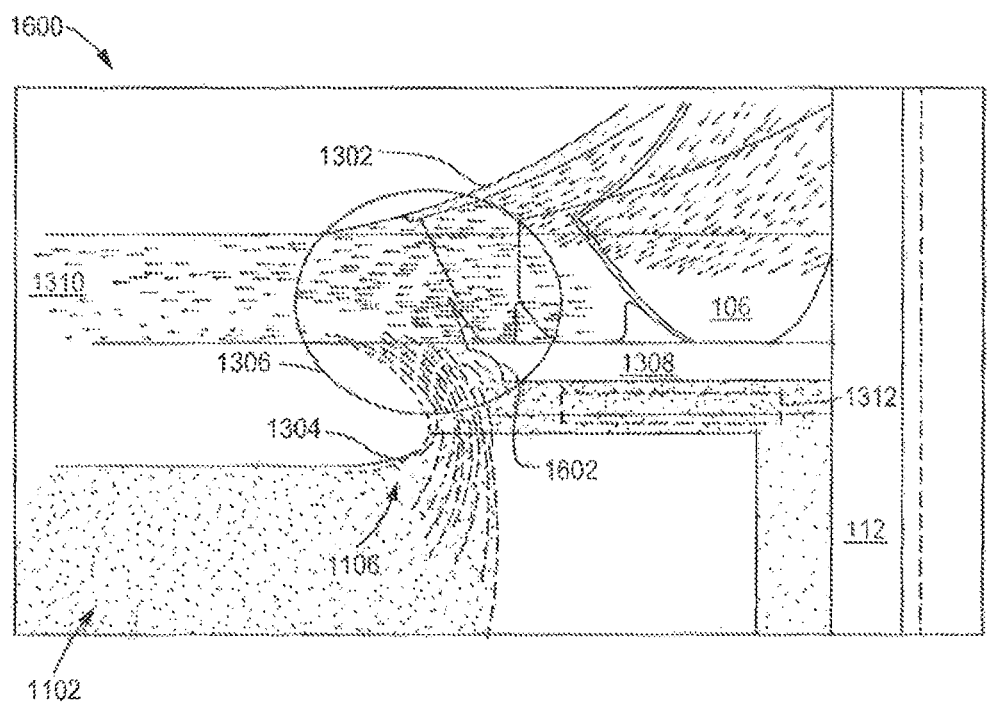
FIG. 16 depicts a second cross-sectional view of a junction area, in accordance with an embodiment of the present disclosure.

FIG. 16 depicts a second cross-sectional view of a junction area, in accordance with an embodiment of the present disclosure. In particular, FIG. 16 depicts the cross-sectional view 1600 that is similar to the view 1300 of FIG. 13. In the view 1600, the compressor wheel 106 includes aback surface 1308 that produces a compressor wheel pocket 1312 with a scalloped edge 1602. The scalloped edge 1602 directs a portion of the EGR flow 1304 towards the junction area 1306 to align the EGR flow 1304 with the fresh air flow 1302.

INDUSTRIAL APPLICABILITY

In general, the teachings of the present disclosure may find broad applicability in many industries including, but not limited to, automotive, single-track vehicle, marine, electronic, stationary power, and transportation industries. In particular, the present disclosure may find applicability in any industry using engines operating with exhaust gas recirculation.

Significant improvements in efficiency may be realized utilizing the teachings of the present disclosure. It is possible to drive a greater than 400 mbar pressure advantage and to permit driving of EGR flow under more various operating conditions. These improvements may correspond to a 2.5% to a 3.5% reduction in BSFC (brake specific fuel consumption) at cruising operating conditions (e.g., in trucks) and a 1.5% to a 2.5% reduction in BSFC at peak torque conditions.

Figure 17:
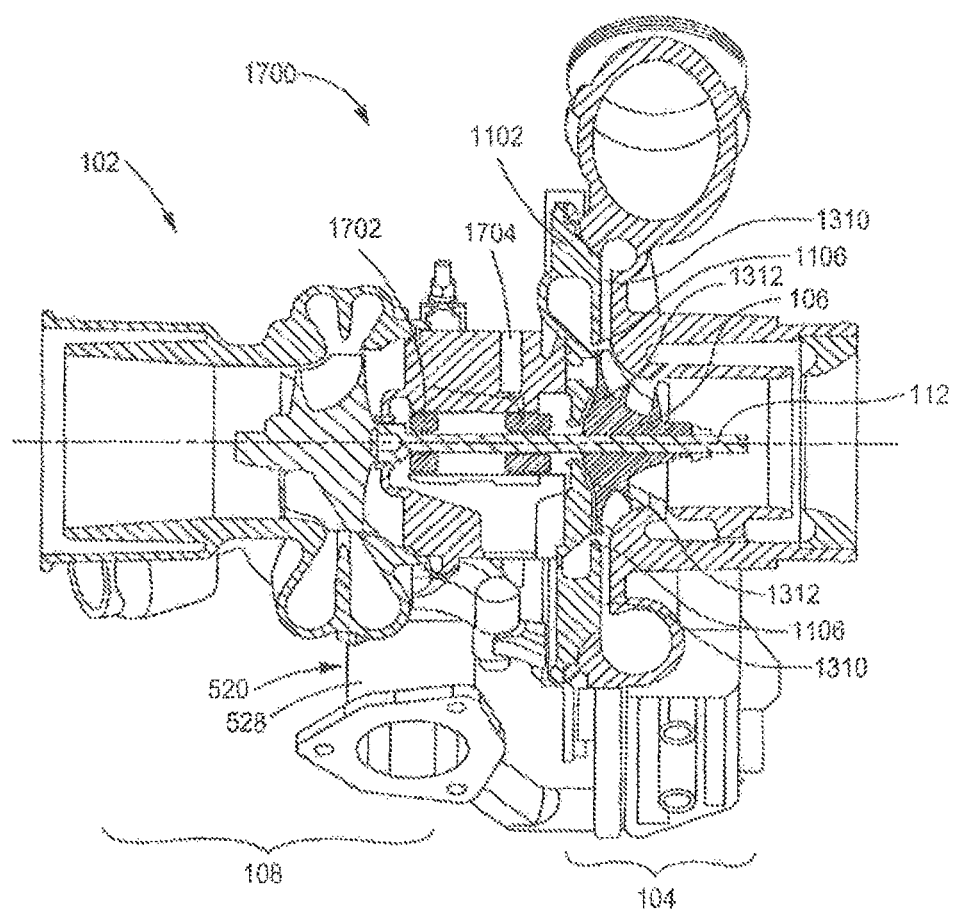
FIG. 17 depicts a cross-sectional view of a turbocharger system, in accordance with an embodiment of the present disclosure.

FIG. 17 depicts a cross-sectional view of a turbocharger system, in accordance with an embodiment of the present disclosure. In particular, FIG. 17 depicts the cross-sectional view 1700 of the turbocharger 102. The turbine 108 is depicted on the left portion and the compressor 104 is depicted on the right portion. The turbine 108 and the compressor 104 are connected by the common shaft 112 and are supported by the common shaft 112. A bearing system 1702 is supplied oil by a bearing oil system 1704. The location of the compressor wheel pocket 1312 is depicted between the compressor wheel 106 and the housing of the compressor. The turbocharger compressor EGR volute 1102 is affixed to the compressor 104 to provide the EGR outlet 1106 in the vicinity of the trailing edge of the compressor wheel 106. The EGR control valve 520 is depicted installed to the turbine volute 504. As seen in the view 1700, both the EGR control valve 520 and the turbocharger compressor EGR volute 1102 are integrated into the housing 1706 of the turbocharger 102.

Figure 18:
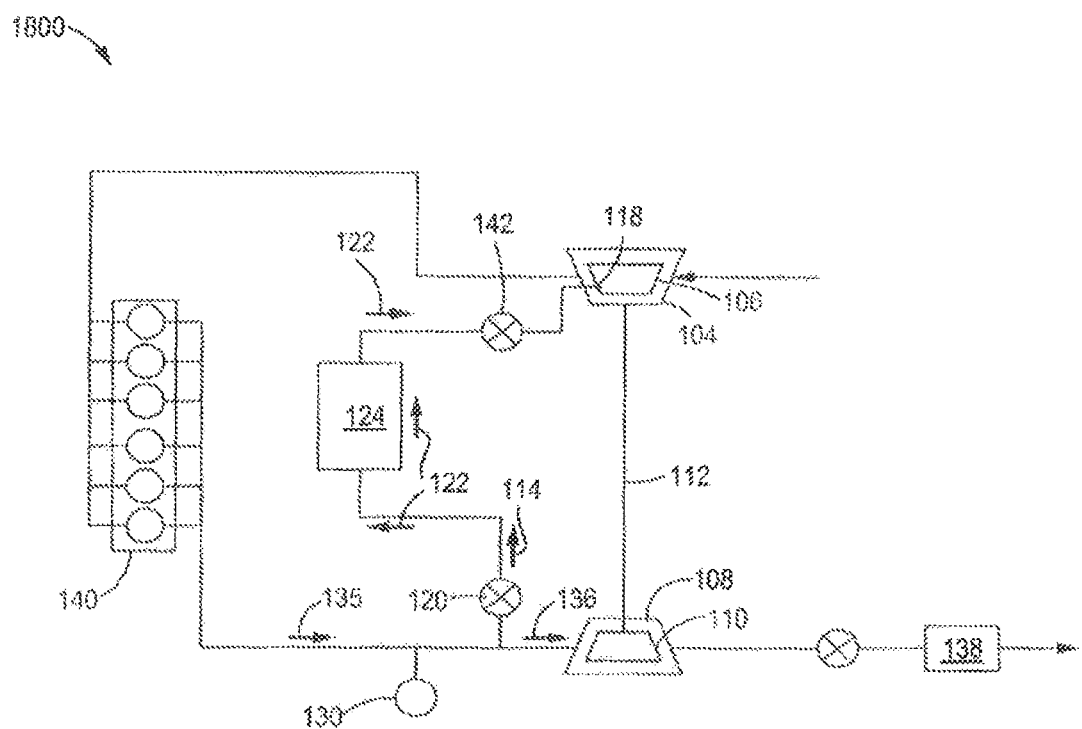
FIG. 18 depicts a system overview of a second engine air system, in accordance with an embodiment of the present disclosure.

FIG. 18 depicts a system overview of a second engine air system, in accordance with an embodiment of the present disclosure. In particular, FIG. 18 depicts the engine air system 1800. The engine air system 1800 is similar to the engine air system 100 of FIG. 1, however, the engine air system 1800 does not include a wastegate (e.g., 132) or an EGR cooler bypass (e.g., 126). In typical engine air systems, operating conditions of the engine air system are determined at least in part on system measurements obtained in the wastegate flow path. In systems without a wastegate (e.g., the engine air system 1800), turbocharger performance and operating parameters may be determined by a position of the EGR control valve 120 and an exhaust pressure. The measured operating parameters may be checked against a calibration table for a given EGR control valve 120 position. This check may provide for further adjustments to the EGR control valve 120 or to provide indications of potential out of specification conditions within the engine air system. These operating parameters may be utilized to implement a speed control strategy for the turbocharger, and the additional components of a wastegate and its associated sensors may be eliminated from the engine air system.

As depicted in the engine air system 1800, the incorporation of the control valve and the turbocharger compressor EGR volute into the turbocharger enables a reduction in package size, cost, and weight of the powertrain platform.

While the forgoing detailed description has been provided with respect to certain specific embodiments, it is to be understood the scope of the disclosure should not be limited to such embodiments. The breadth and spirit of the present disclosure is broader than the embodiments specifically disclosed and encompassed within the following claims.

Moreover, while some features are described in conjunction with certain specific embodiments, these features are not limited to use with only the embodiment with which they are described. Rather, aspects of the specific embodiments can be combined with or substituted by other features disclosed on conjunction with alternate embodiments.

What is claimed is:

1. An exhaust gas recirculation (EGR) control valve for a turbine volute, the EGR control valve comprising:
a sealing flap operationally connected to a rotational drive mechanism at a proximal end, the sealing flap including a sealing surface that includes rounded edges;
an EGR outlet duct configured to be mated to a turbine volute opening and provide for an EGR flow path; and the rotational drive mechanism is configured to move the sealing flap between first position and a second position to selectively provide fluid communication between:
(a) the turbine volute and the EGR flow path, or (b) the turbine volute and a turbine exhaust path, or (c) the turbine volute and both the EGR flow path and the turbine exhaust path; wherein:
in the first position, the turbine volute opening is sealed closed by the rounded edges mating with a chamfered edge of the turbine volute opening;
in the second position the EGR flow path is provided from the turbine volute through the turbine volute opening to the EGR outlet duct; and
in an intermediate position disposed between the first and second position, the turbine exhaust path is partially blocked by the sealing flap and the EGR flow path is provided from the turbine volute through the turbine volute opening to the EGR outlet duct.

2. The EGR control valve of claim 1, wherein in the second position, a first side and a second side of the sealing flap are configured to seal against a first volute wall and a second volute wall that are machined walls.

3. The EGR control valve of claim 1, further comprising a vertical offset between the rotational drive mechanism and the chamfered edge of the turbine volute opening.

4. The EGR control valve of claim 1, wherein the sealing flap further comprises:
side seals disposed on sides of the sealing flap between the proximal end and a distal end; and
a gas port disposed on the sealing side of the sealing flap and fluidly connected to the side seals; wherein in the second position, an exhaust gas pressure acting on the gas port causes the side seals to press against turbine volute side walls.

5. The EGR control valve of claim 2, wherein when the sealing flap is in the second position, the turbine exhaust path is substantially blocked by the sealing flap.

6. The EGR control valve of claim 1, wherein when the sealing flap is in the first position, the EGR flow path is blocked by the sealing flap.

7. The EGR control valve of claim 1, in which the sealing surface further includes rounded corners configured to mate with fillets disposed in the turbine volute.

8. An exhaust gas recirculation (EGR) control valve for a turbine volute, the EGR control valve comprising:
a valve member configured to be disposed in a turbine volute and operationally connected to an actuator, the valve member including a sealing flap including a sealing surface with rounded edges;
an EGR outlet duct configured to be mated to a turbine volute opening and provide for an EGR flow path; and
an actuator configured to move the valve member between a first position and a second position to selectively provide fluid communication between: (a) the turbine volute and the EGR flow path, or (b) the turbine volute and a turbine exhaust path, or (c) the turbine volute and both the EGR flow path and the turbine exhaust path; wherein:
in the first position, the turbine volute opening is sealed closed by the valve member;
in the second position the EGR flow path is provided from the turbine volute through the turbine volute opening to the EGR outlet duct; and
in an intermediate position disposed between the first and second position, the turbine exhaust path is partially blocked and the EGR flow path is provided from the turbine volute through the turbine volute opening to the EGR outlet duct.

9. The EGR control valve of claim 8 in which the valve member includes a concave surface opposite to the sealing surface, the sealing surface configured to align with a housing wall of the turbine volute when the valve member is in the first position.

10. The EGR control valve of claim 9, wherein the concave surface is configured to guide exhaust flow to the EGR flow path when the valve member is in the intermediate position.

11. The EGR control valve of claim 9, wherein the concave surface is configured to guide exhaust flow to the EGR flow path when the valve member is in the second position.

12. The EGR control valve of claim 9, wherein when the valve member is in the second position, the sealing surface is adjacent to a bottom surface of the turbine volute.

13. The EGR control valve of claim 12, wherein when the valve member is in the second position, the turbine exhaust path is substantially blocked by the valve member.

14. The EGR control valve of claim 9, wherein when the valve member is in the first position, the sealing surface is disposed over the turbine volute opening.

15. The EGR control valve of claim 8, wherein the actuator is a linear motion actuator.

16. The EGR control valve of claim 8, wherein the valve member is a flapper and the actuator is a rotary actuator.

17. The EGR control valve of claim 16, in which a distal end of the flapper is configured to mate with a recess in the turbine volute when the flapper is in the second position.

18. An exhaust gas recirculation (EGR) control valve for a turbine volute, the EGR control valve comprising:
a valve member configured to be disposed in a turbine volute and operationally connected to an actuator, the valve member including a sealing flap including a sealing surface with rounded edges;
an EGR outlet duct configured to be mated to a turbine volute opening and provide for an EGR flow path;
an actuator configured to move the valve member between a first position and a second position to selectively provide fluid communication between: (a) the turbine volute and the EGR flow path, or (b) the turbine volute and a turbine exhaust path, or (c) the turbine volute and both the EGR flow path and the turbine exhaust path; wherein:
in the first position, the valve member is disposed over the turbine volute opening and the turbine volute opening is sealed closed by the valve member;
in the second position the EGR flow path is provided from the turbine volute through the turbine volute opening to the EGR outlet duct and the turbine exhaust path is substantially blocked by the valve member; and
in an intermediate position disposed between the first and second position, the turbine exhaust path is partially blocked and the EGR flow path is provided from the turbine volute through the turbine volute opening to the EGR outlet duct;
a valve position indicator configured to output a valve position of the valve member; and
an EGR pressure sensor configured to determine and output an exhaust gas pressure.

19. The EGR control valve of claim 18, wherein the valve member is configured to be positionable to provide a first EGR rate in a low-heat mode and positionable to provide a second EGR rate in a normal operating mode, the first EGR rate being greater than the second EGR rate.

20. The EGR control valve of claim 18, wherein the valve member is configured to be repositionable in response to a control signal received from an engine control unit (ECU).

* * * * *